Aug. 19, 1930.  J. W. BRYCE  1,773,421
TIME RECORDER
Original Filed May 12, 1924   18 Sheets-Sheet 2

Inventor
James W. Bryce
By his Attorneys
Cooker, Kerr & Dunham

Aug. 19, 1930.  J. W. BRYCE  1,773,421
TIME RECORDER
Original Filed May 12, 1924  18 Sheets-Sheet 4

Fig. 4,

Inventor
James W. Bryce
By his Attorneys
Cooper, Kerr & Dunham

Fig.6,

Aug. 19, 1930.  J. W. BRYCE  1,773,421
TIME RECORDER
Original Filed May 12, 1924   18 Sheets-Sheet 10

Inventor
James W. Bryce
By his Attorneys
Cooper, Kerr & Dunham

Aug. 19, 1930.  J. W. BRYCE  1,773,421
TIME RECORDER
Original Filed May 12, 1924    18 Sheets-Sheet 11
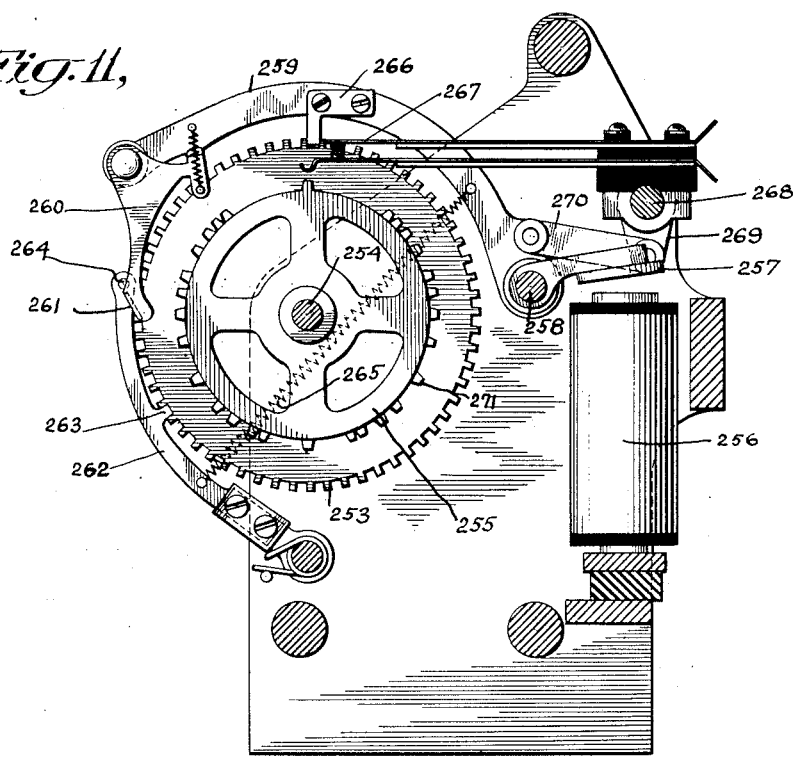
Fig.11,
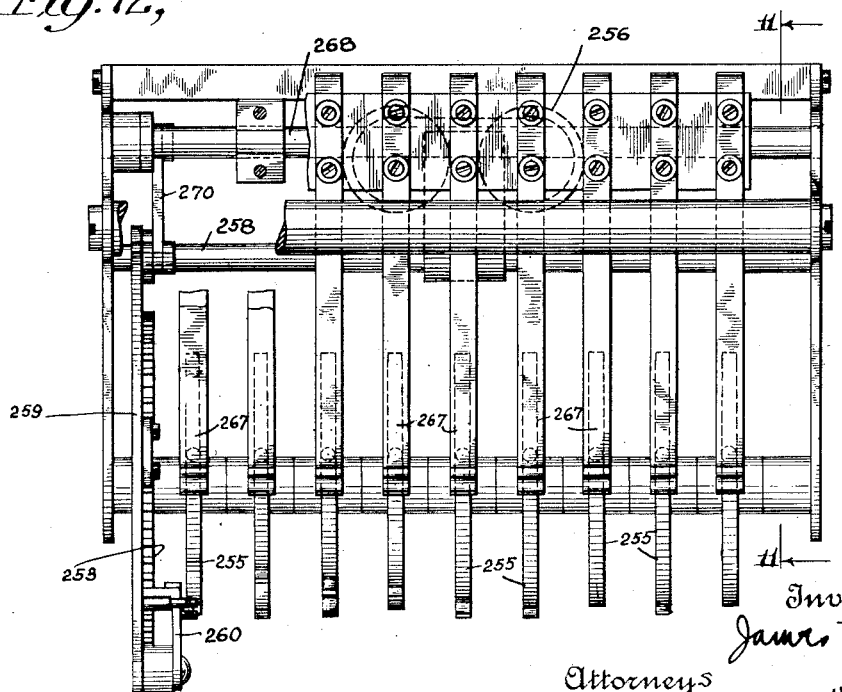
Fig.12, Aug. 19, 1930.                J. W. BRYCE                1,773,421
                              TIME RECORDER
                  Original Filed May 12, 1924    18 Sheets-Sheet 12
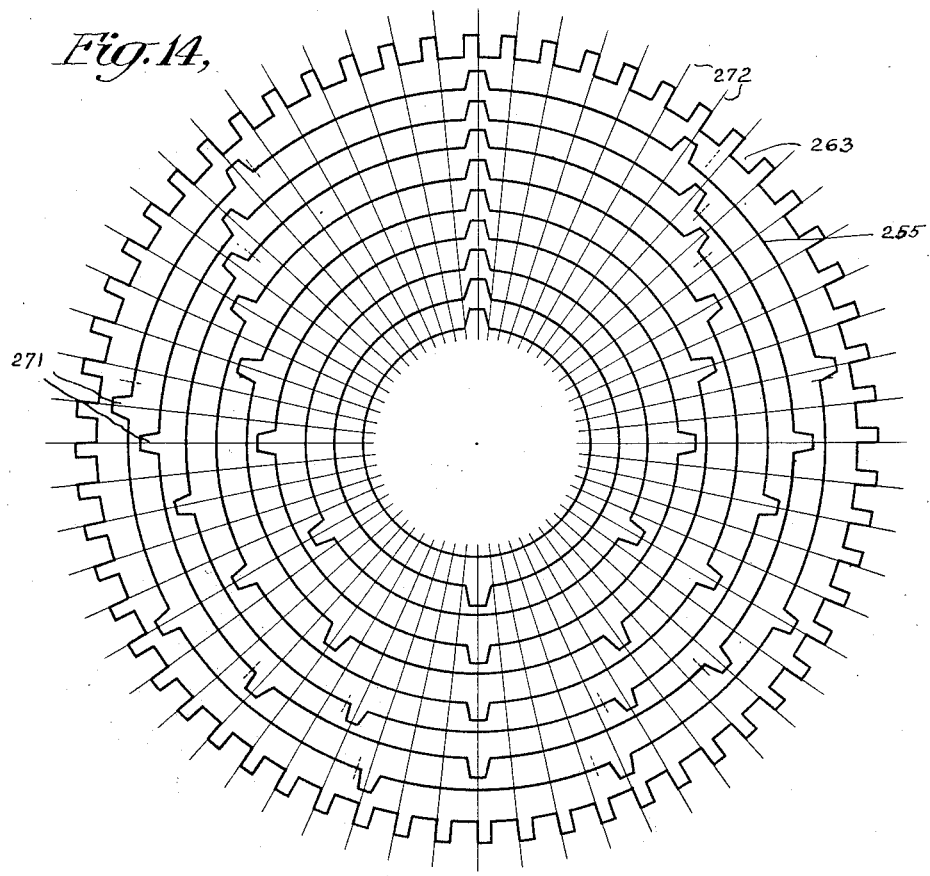
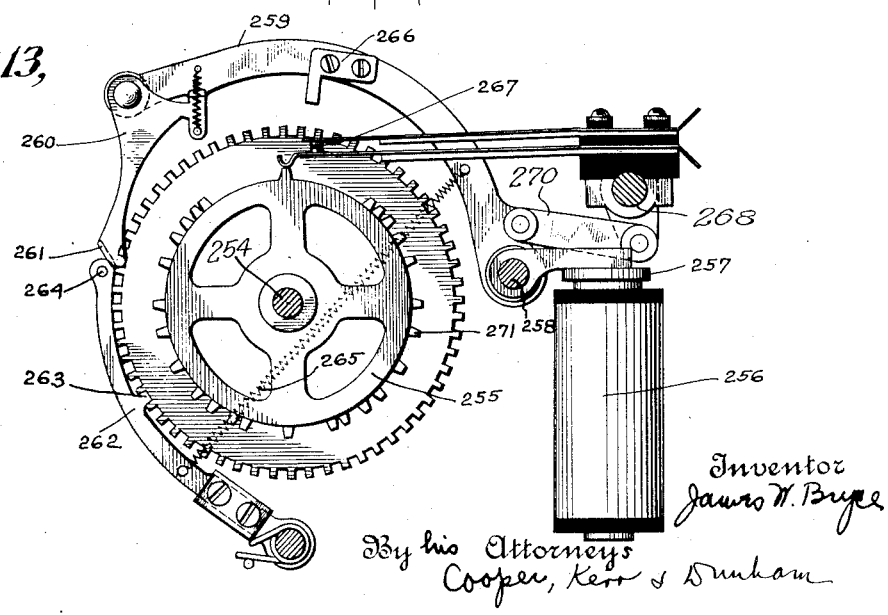

Aug. 19, 1930.  J. W. BRYCE  1,773,421
TIME RECORDER
Original Filed May 12, 1924  18 Sheets-Sheet 13
Fig. 15,
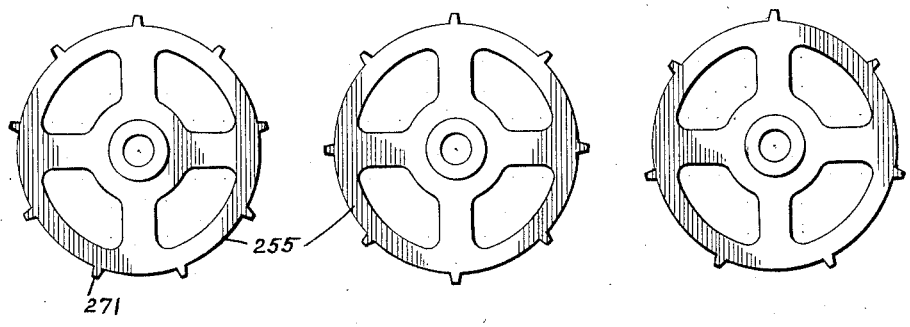
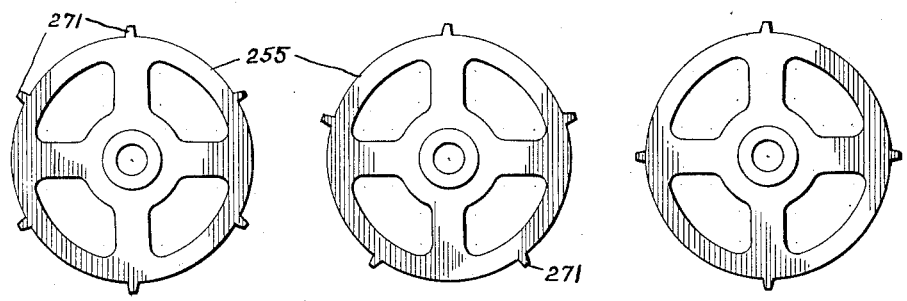
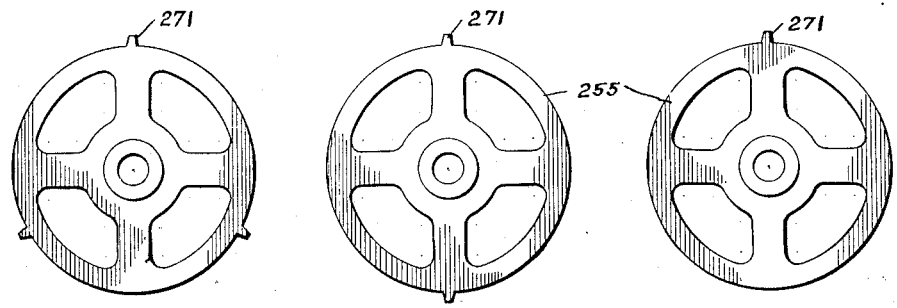

Aug. 19, 1930.    J. W. BRYCE    1,773,421
TIME RECORDER
Original Filed May 12, 1924    18 Sheets-Sheet 14

Inventor
James W. Bryce
By his Attorneys
Cooper, Kerr & Dunham

Aug. 19, 1930. J. W. BRYCE 1,773,421
TIME RECORDER
Original Filed May 12, 1924   18 Sheets-Sheet 15

Inventor
James W. Bryce
Attorneys
Cooper, Kerr & Dunham

Aug. 19, 1930.  J. W. BRYCE  1,773,421
TIME RECORDER
Original Filed May 12, 1924   18 Sheets-Sheet 16
Fig.23,
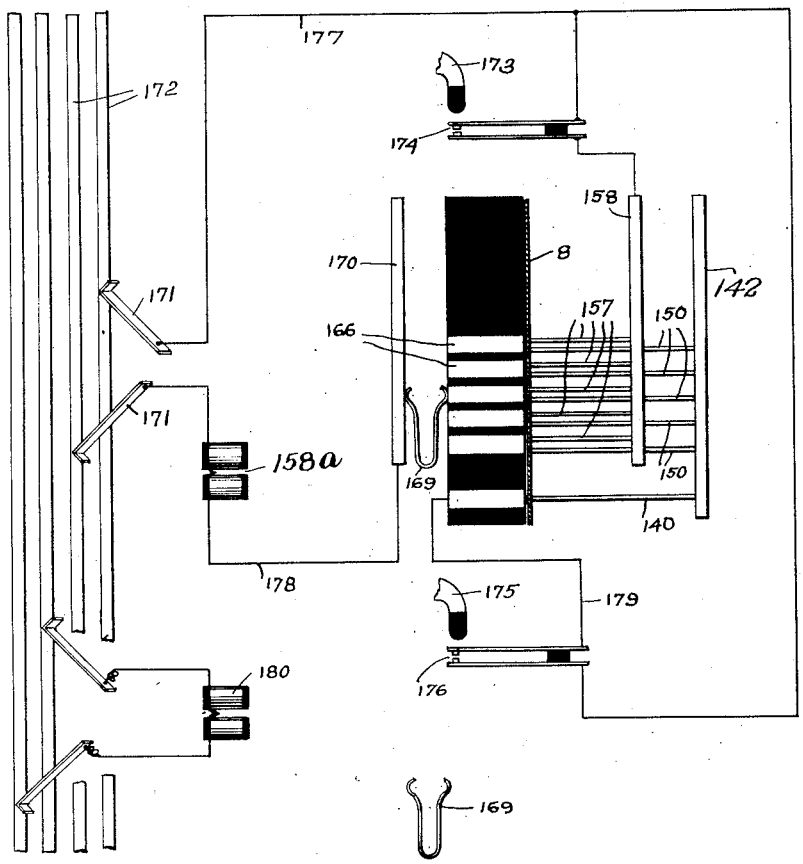
Fig.22,
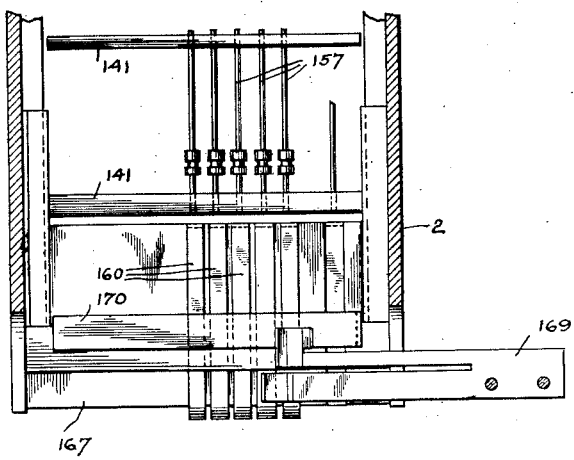
Inventor
James W. Bryce
By his Attorneys
Cooper, Kerr + Dunham Aug. 19, 1930.  J. W. BRYCE  1,773,421
TIME RECORDER
Original Filed May 12, 1924   18 Sheets-Sheet 17

INVENTOR.
James W. Bryce
BY Cooper, Kerr & Dunham
his ATTORNEYS.

Aug. 19, 1930. J. W. BRYCE 1,773,421
TIME RECORDER
Original Filed May 12, 1924   18 Sheets-Sheet 18

Patented Aug. 19, 1930

1,773,421

UNITED STATES PATENT OFFICE

JAMES W. BRYCE, OF BLOOMFIELD, NEW JERSEY, ASSIGNOR TO INTERNATIONAL TIME RECORDING COMPANY OF NEW YORK, OF ENDICOTT, NEW YORK, A CORPORATION OF NEW YORK

TIME RECORDER

Application filed May 12, 1924, Serial No. 712,554. Renewed October 12, 1928.

This invention relates to multiple cost recorders. More specifically, it is a time-controlled device for computing the costs of jobs performed by a number of workmen receiving different rates of pay.

When a workman commences a particular job he is given a card bearing the designation of that job. The card may also bear the name or number of the workman and an indication of his rate of pay. He inserts this card in the machine, adjusting the same according to his rate of pay, and punches. The card thus receives a set of perforations representing a number which, standing alone is arbitrary. The punch-controlling devices, however, are constantly changing under control of clock mechanism and rate mechanism. When the job is completed the card is again inserted in the machine and punched. The set of perforations now received represents a different number from that previously received and the difference between the two numbers represents the cost of the job.

In my United States Patent No. 1,340,435, dated May 18, 1920, for cost keeping machines I disclosed a time-controlled device adapted to operate to accumulate costs at given rates during the working hours of a day and to automatically suspend such accumulations during the lunch period and during the non-working hours of the night. Similar timing devices may be employed in the present machine so that cost accumulations will take place only while work is being performed on the job, and where a job is started at a particular time on one day and is completed several days later, a punching at the beginning and again when the work is completed will produce correct figures for the job.

One of the objects of the invention then, is to produce a machine adapted to reckon and record the costs of a large number of jobs being performed by a large number of workmen receiving varying rates of pay. Other objects will appear in the following description of the invention.

Referring to the drawings wherein I have shown what I now consider to be the preferred form of my invention:

Fig. 11 is a section taken on line 11—11 of Fig. 12 showing time-controlled cam wheels and electric contacts adapted to be actuated thereby.

Fig. 12 is a top plan view of the mechanism shown in Fig. 11.

Fig. 13 is a view similar to Fig. 11 with some of the parts in slightly different positions.

Fig. 14 is a diagrammatic view showing the relations of a plurality of the time controlled cam wheels to each other.

Fig. 15 shows the several cam wheels.

Fig. 22 is a section taken on line 22—22 of Fig. 6.

Fig. 23 is a diagram of the card-punching automatic control.

Figure 24:
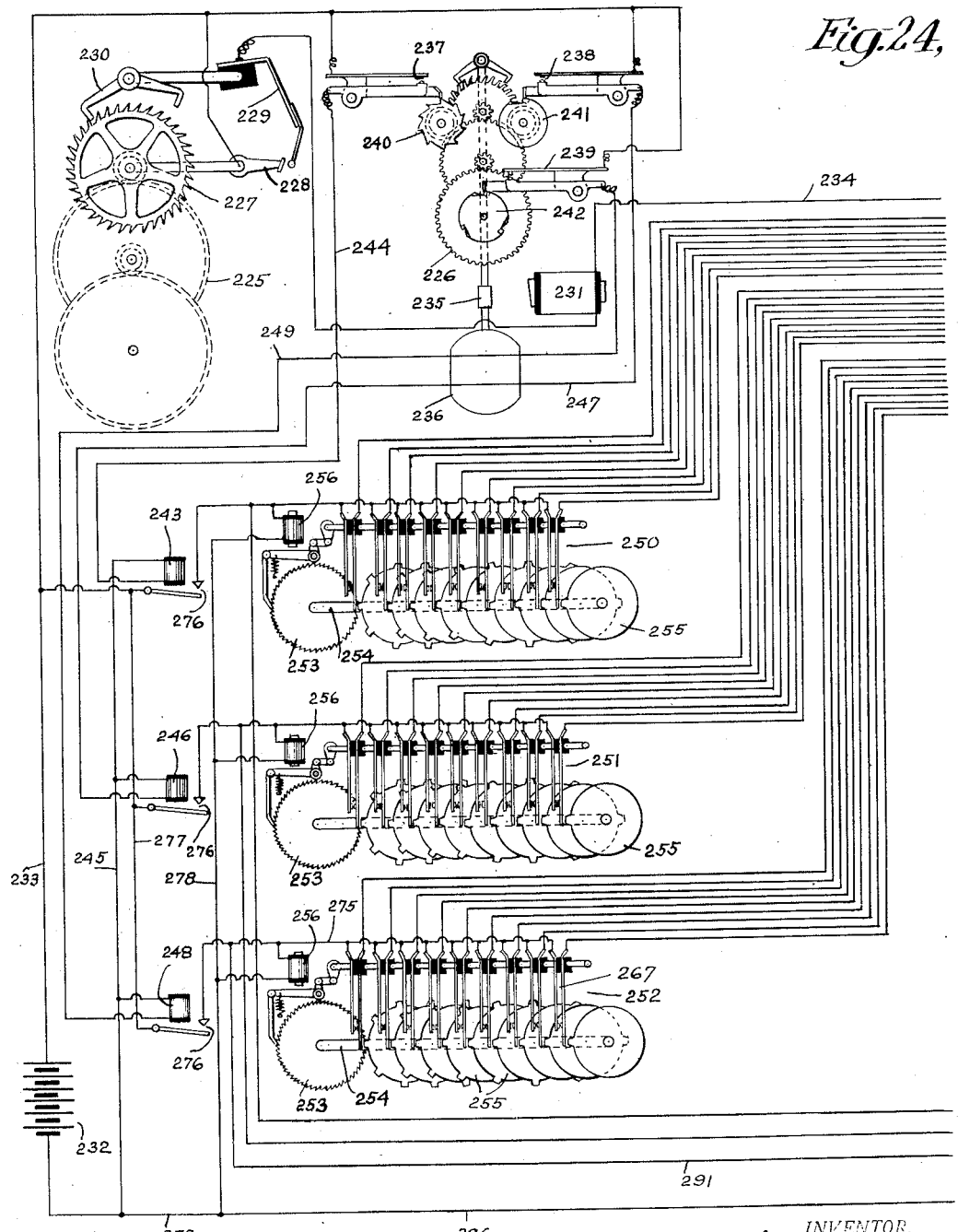
Figure 24A:
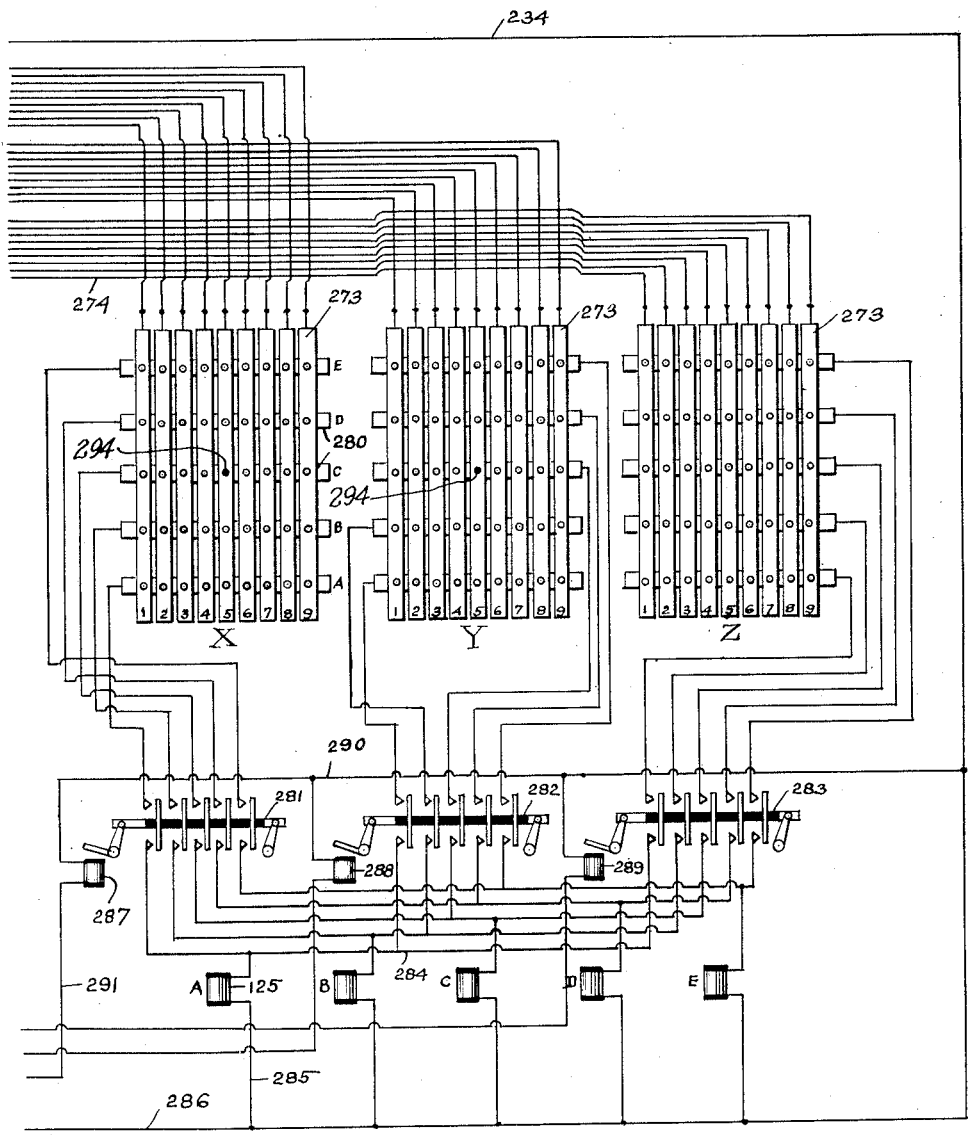

Figs. 24 and 24ª constitute a wiring diagram of the machine.

Figure 21:
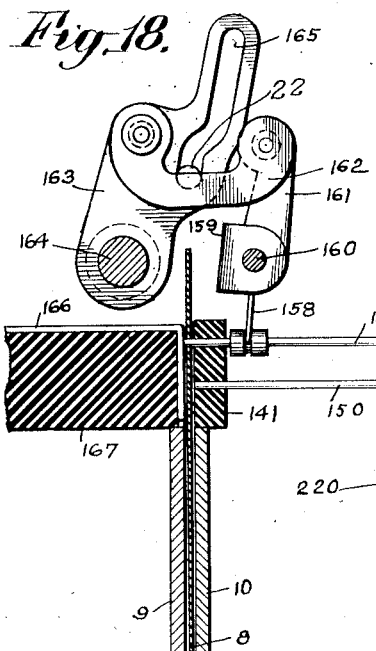
Fig. 21 is a representation of a card having been punched in the machine.

In Fig. 21 I have shown a card of the standard Hollerith type adapted for use in the present machine. The card may be divided into several columns for recording the part number, job number, employee's number and other usual or desired data concerning a job. In the 15th point index column I have shown the five upper index points marked A to E inclusive representing five separate wage rates. If the workman receives rate C, then as shown a hole will be punched at the point representing this rate before it is given to him. Let us presume the rate to be 55 cents an hour. The machine will not operate upon the card now unless it is adjusted when the card is inserted, to operate at the rate indicated by the hole in the card. Having inserted the card and made the proper adjustment the workman will press a lever to actuate the punches and the card will receive a series of perforations representing an arbitrary number then contained in the machine at the station representing the wage rate in question. This number is punched in the first and every third successive index point column thereafter, or more specifically, in the first, fourth, seventh and tenth columns. In the present instance the perforations in these columns represent the number 1452. At the completion of the job the workman will again insert the card and adjusting it to the proper wage rate, punch a second set of holes. These holes are in the third and each third successive point column thereafter, or more specifically, in the third, sixth, ninth and twelfth columns. The perforations here shown represent the number 1635. The difference between these two numbers is 183. The card shows then, that the cost of this job performed by a man whose rate of pay is 55 cents an hour is $1.83.

Immediately to the right of the middle of the card are two columns marked Start and Stop respectively. During the first punching operation by the machine the time of starting the job was automatically printed in the "start" column and is shown as 1:02. When the second punching operation is effected the time of finishing is similarly printed and is shown as 4:22. Thus the time consumed in performing the job was three hours and twenty minutes. At the rate of 55 cents an hour the cost of the job computed with pencil and paper is $1.83⅓. It will be seen that there is a difference of a third of a cent between the two ways in which we have computed the cost, but it will be found that the difference is a smaller amount than is usually reckoned with in dealing with cost figures, being ordinarily only a small fraction of a cent.

Figure 1:
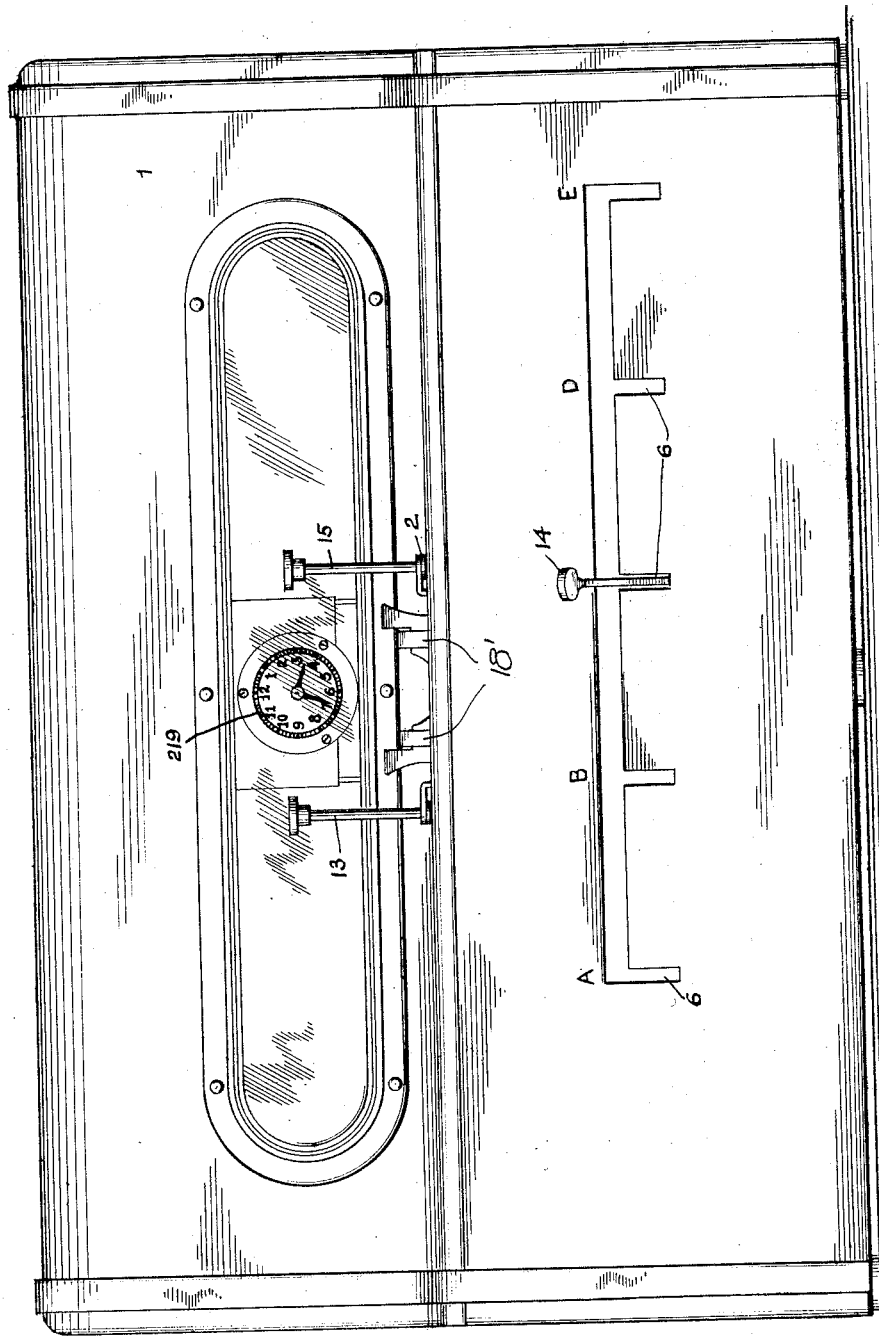
Fig. 1 is front elevation of the machine.
Figure 6:
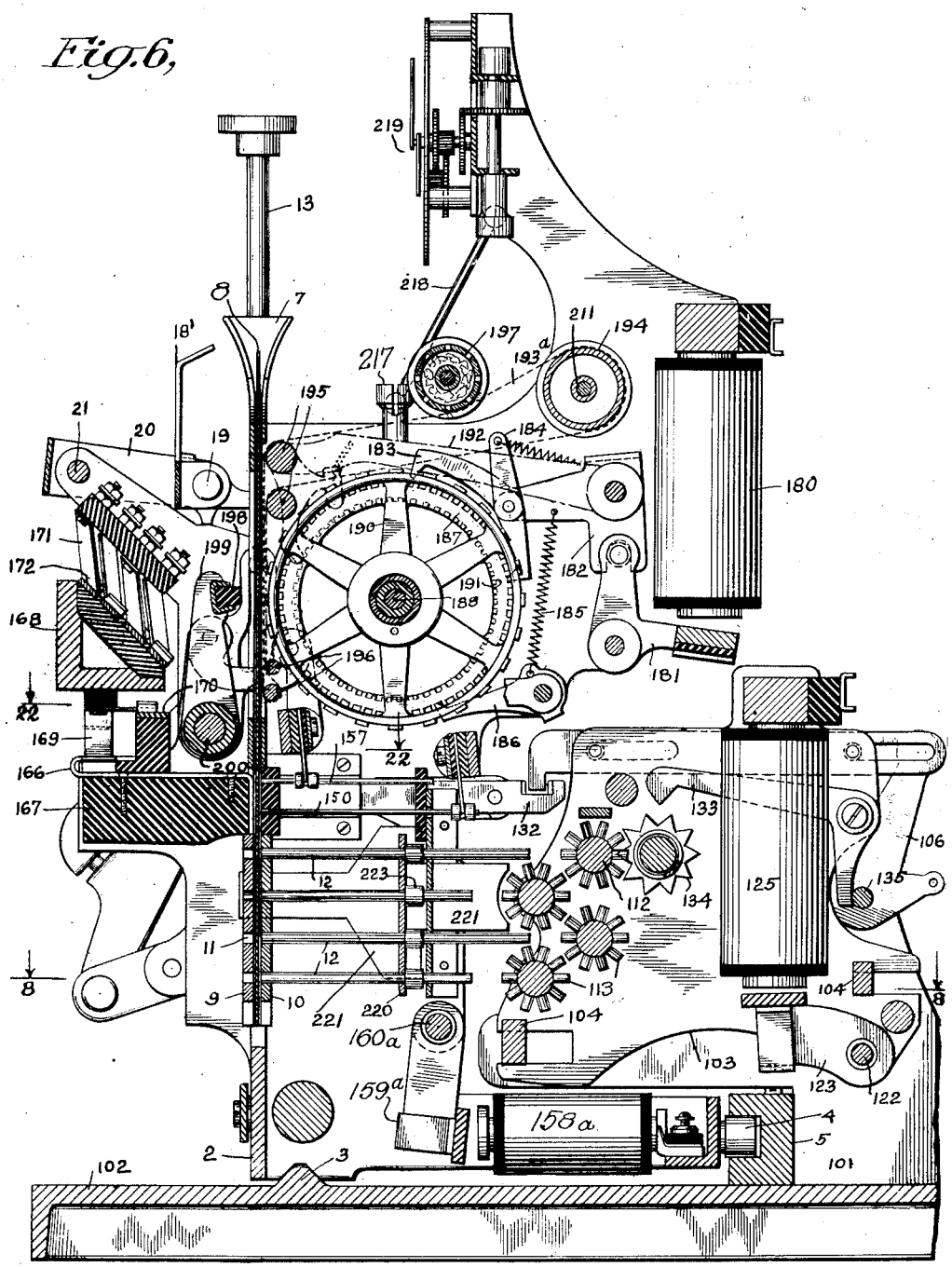
Fig. 6 is a sectional view of the carriage taken on line 6—6 of Fig. 4, and also showing part of the non-sliding portion of the machine.
Figure 8:
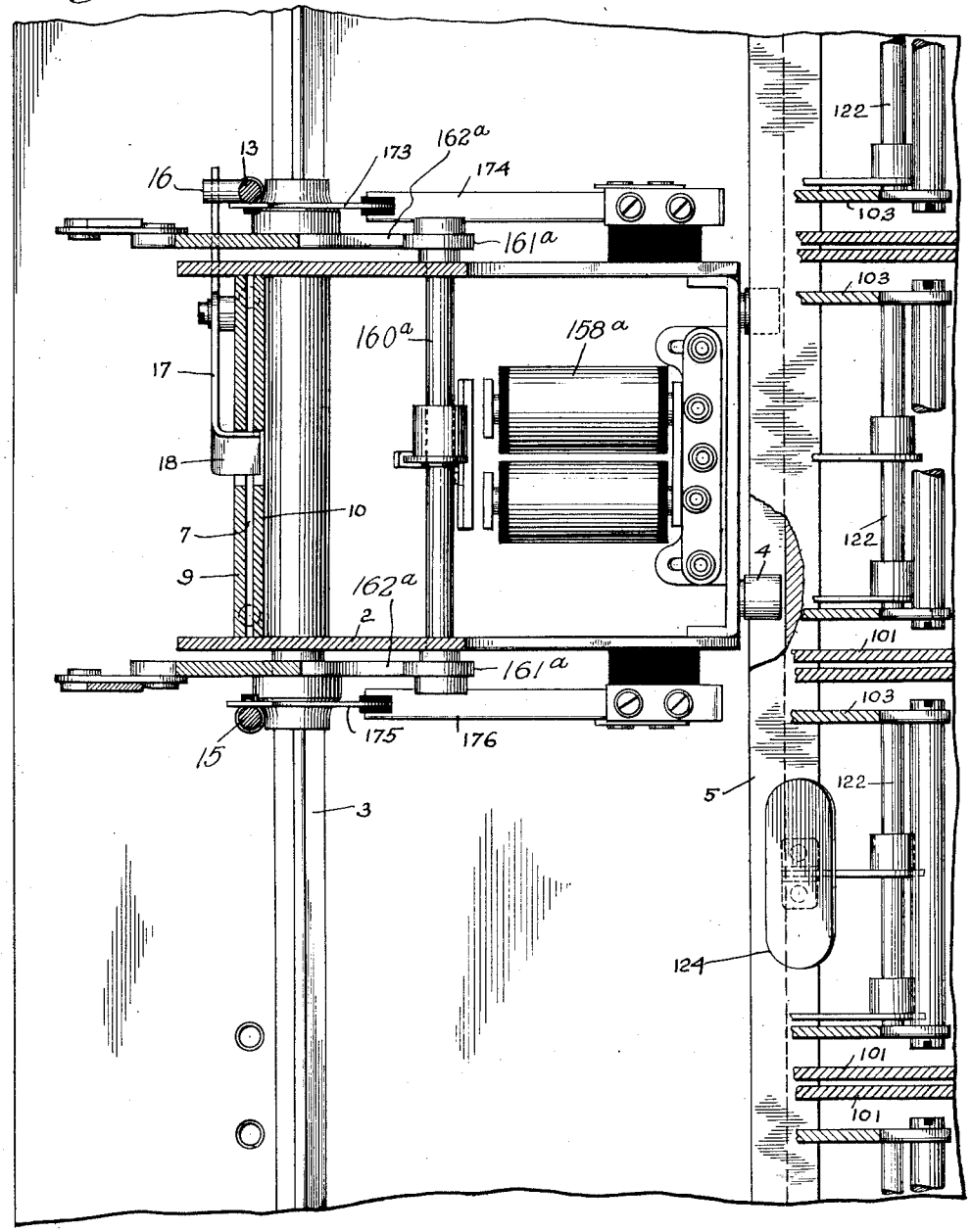
Fig. 8 is a section taken on line 8—8 of Fig. 6.

In the drawings the machine is shown as comprising a casing 1, containing the mechanisms which include a carriage 2 mounted as well shown in Figs. 6 and 8 on a guide rail 3 at the front and with rollers 4 in a channel rail 5 at the back. The carriage is thus movable across the machine to a plurality of stations. In the present instance I have shown five of these stations as indicated by the notches 6 in the casing in Fig. 1. The stations are marked A to E respectively and represent five separate rates heretofore referred to.

The carriage is provided with a guide slot 7 into which the card 8 may be inserted with the left end down and the front of the card facing inwardly. This end of the card is thus positioned between the plates 9, 10 with certain columns of hole spaces registering with holes 11 in the plates through which the punches 12 are adapted to operate. There are four rows of holes 11, with ten holes to each row in each of plates 9 and 10. The holes in the two plates are in alignment so that the punches can reach through both plates. There are also four rows of ten punches each cooperating with the rows of holes. The distance between adjacent rows of holes 11 and therefore also between adjacent rows of punches 12 is equal to the distance between three columns of hole positions on the card.

Figure 7:
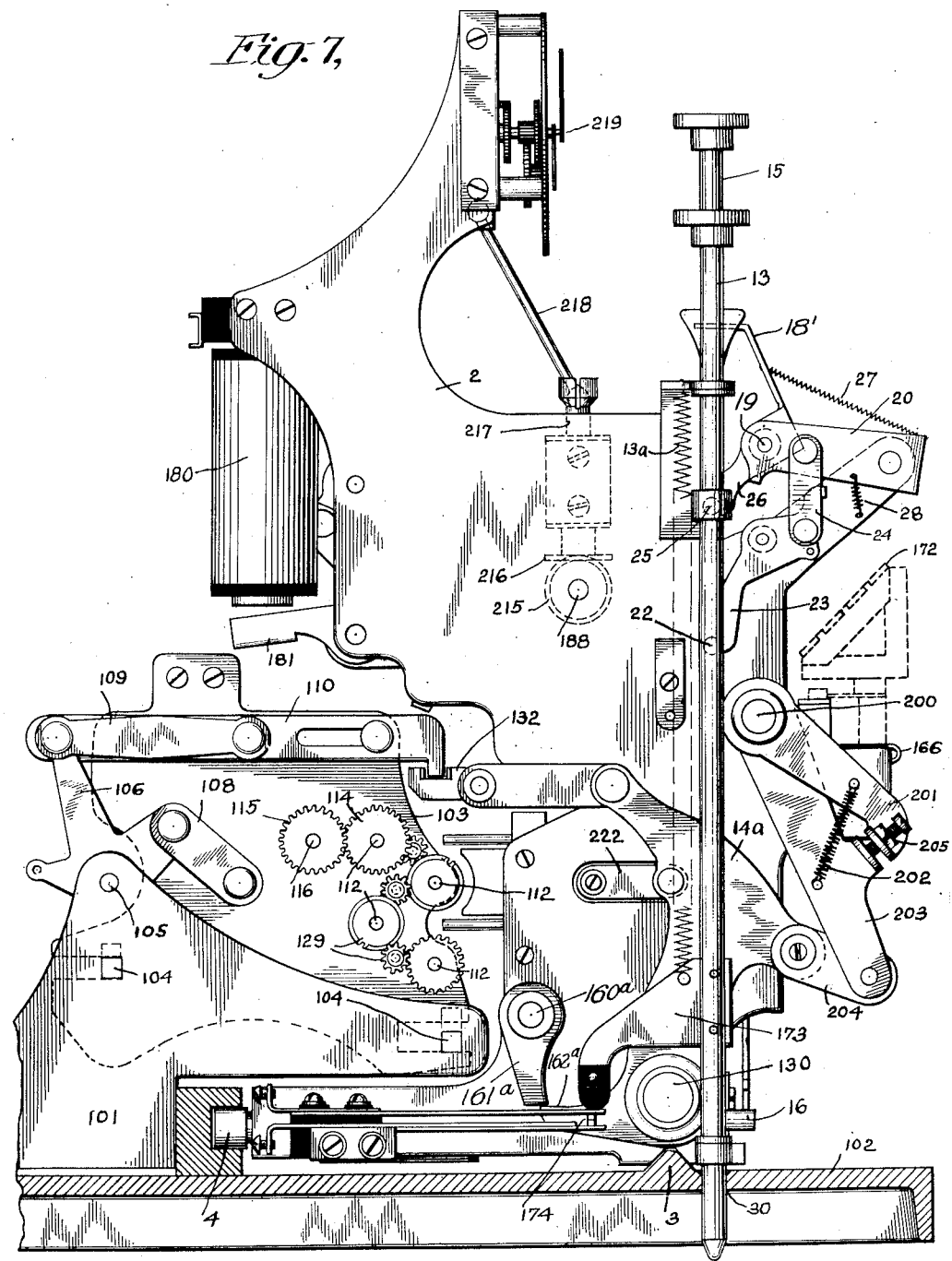
Fig. 7 is a view of the carriage taken from the opposite side from that shown in Fig. 5.

The first set of holes is punched in the first, fourth, seventh and tenth columns on the card as we have seen, and the second set in the third, sixth, ninth and twelfth columns. This is effected in the following manner: When the card is inserted for punching at the beginning of the job, the operator depresses a start key 13 and while holding it down depresses lever 14 (Fig. 5). When the card is inserted at the completion of the job, a stop key 15 is first depressed and then the lever 14. The keys are adapted to be restored by springs 13ª and 15ª (Figs. 7 and 5). The key 13 has near its lower end a pin 16 (Figs. 4 and 8) adapted when depressed to rock a lever 17 having a projection 18 reaching into the card slot 7. When lever 17 is rocked by key 13 the projection 18 is raised so as to stop the card in such position that the first column of hole spaces registers with the lowermost row of holes 11 and punches 12. In its normal position, the lever 17 permits the card to be inserted deeper into the slot so that the third column of hole spaces registers with the lowermost row of punches. The key 15 does not actuate the lever 17.

Both of the keys 13 and 15 are adapted when depressed to actuate means to engage the upper edge of the card to fix it at its proper depth in the slot. A pair of fingers 18' (Figs. 4, 5, 6, and 7) pivoted at 19 to a bail 20 which, in turn, is pivoted at 21 to the carriage, normally occupy the position of Fig. 6. When the start key 13 is depressed, a pin 22 thereon (Figs. 4 and 7) actuates a lever 23 pivoted at 23' and connected by a link 24 to the bail 20 and raises the bail and the fingers 18′ as in Fig. 7. Another pin 25 on the start key actuates a lever 26 integral with the fingers and tilts them forward over the upper edge of the card. A spring 27 will return the fingers when released, and a spring 28 may be provided to return the bail 20. When the stop key 15 is depressed the bail 20 is permitted to remain in its normal position while a pin 29 on the key (Figs. 4 and 5) will actuate another lever 26 (Fig. 5) integral with the fingers 18′ and tilt them forward over the upper edge of the card as in Fig. 5.

Figure 4:
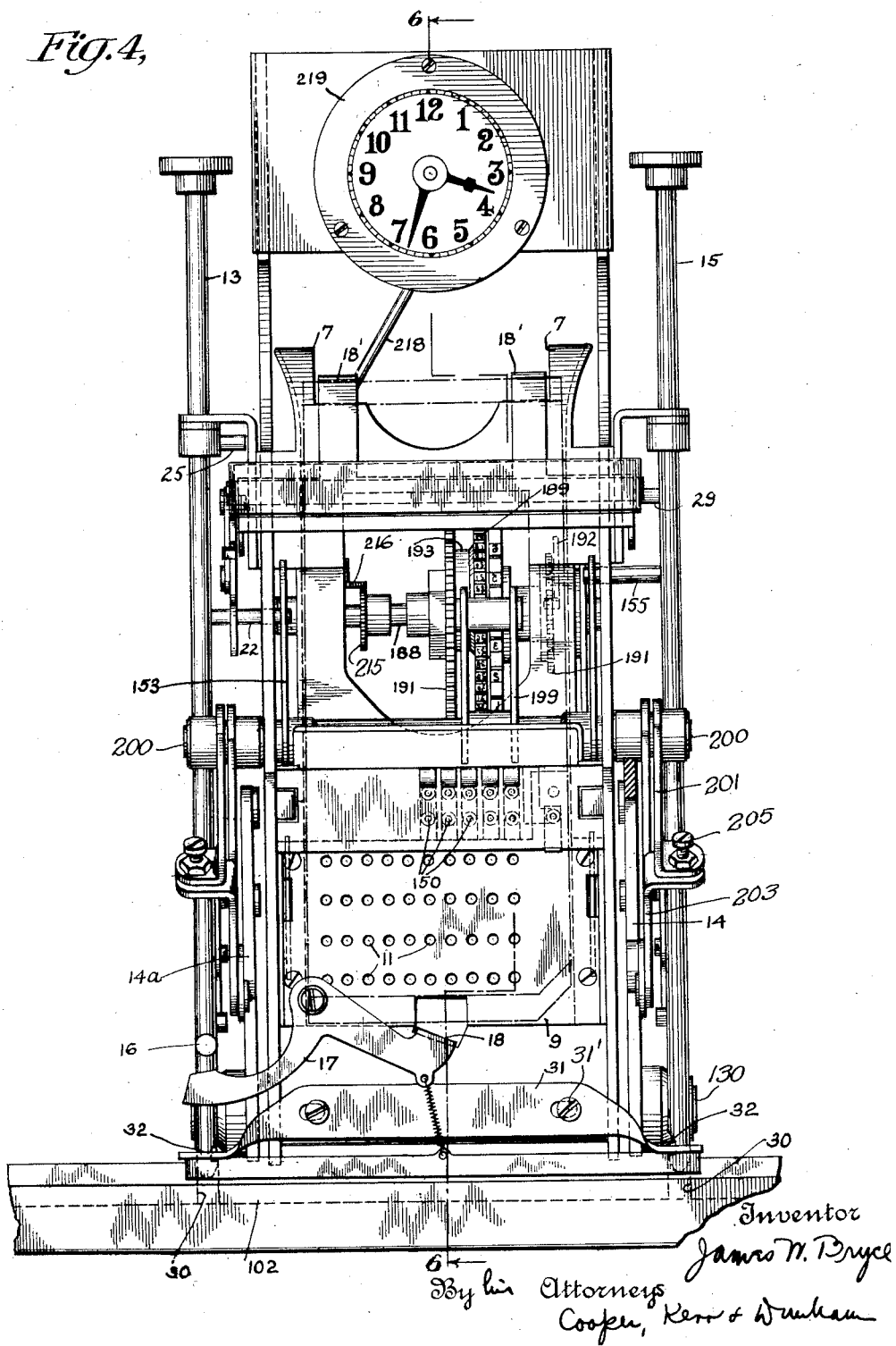
Fig. 4 is a front elevation of a slidable carriage adapted to be moved to various positions representing several rates of pay.
Figure 5:
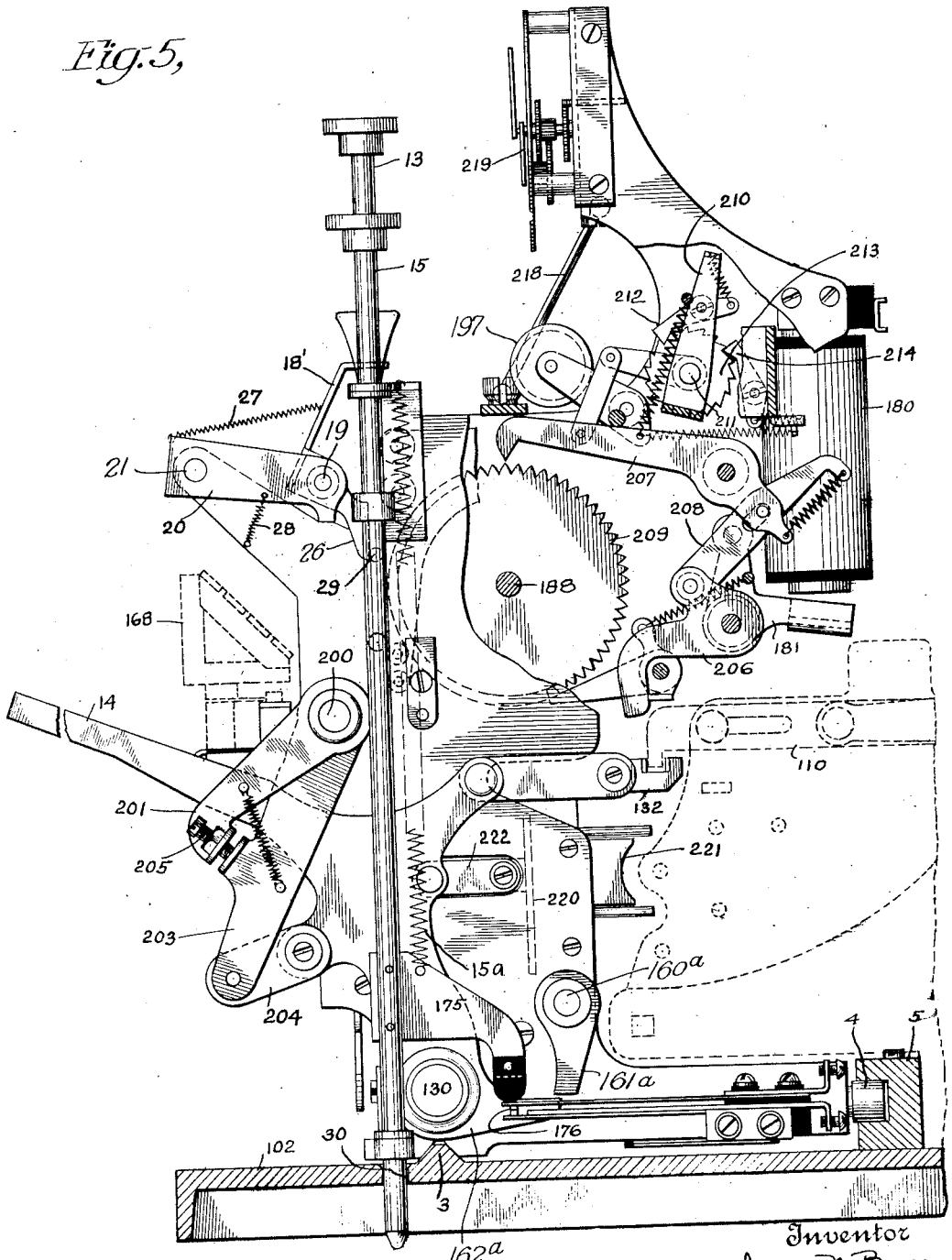
Fig. 5 is a side elevation of said carriage; some parts being shown in section and others broken away.

Another function of the keys 13 and 15 is the adjustment of the carriage by plunging through holes 30 in the base 102 (Figs. 4, 5 and 7).

A plate 31 (Fig. 4) mounted by pin and slot 31′ on the card carriage may be provided with holes at its ends through which the keys 13 and 15 pass; the keys being beveled as at 32 to shift the plate laterally when a key is depressed. By this means, when one key is depressed the other cannot be depressed.

Arranged across the machine back of the card carriage are shown five rate units 100 (Fig. 2), corresponding to the five rate positions of the carriage.

Figure 3:
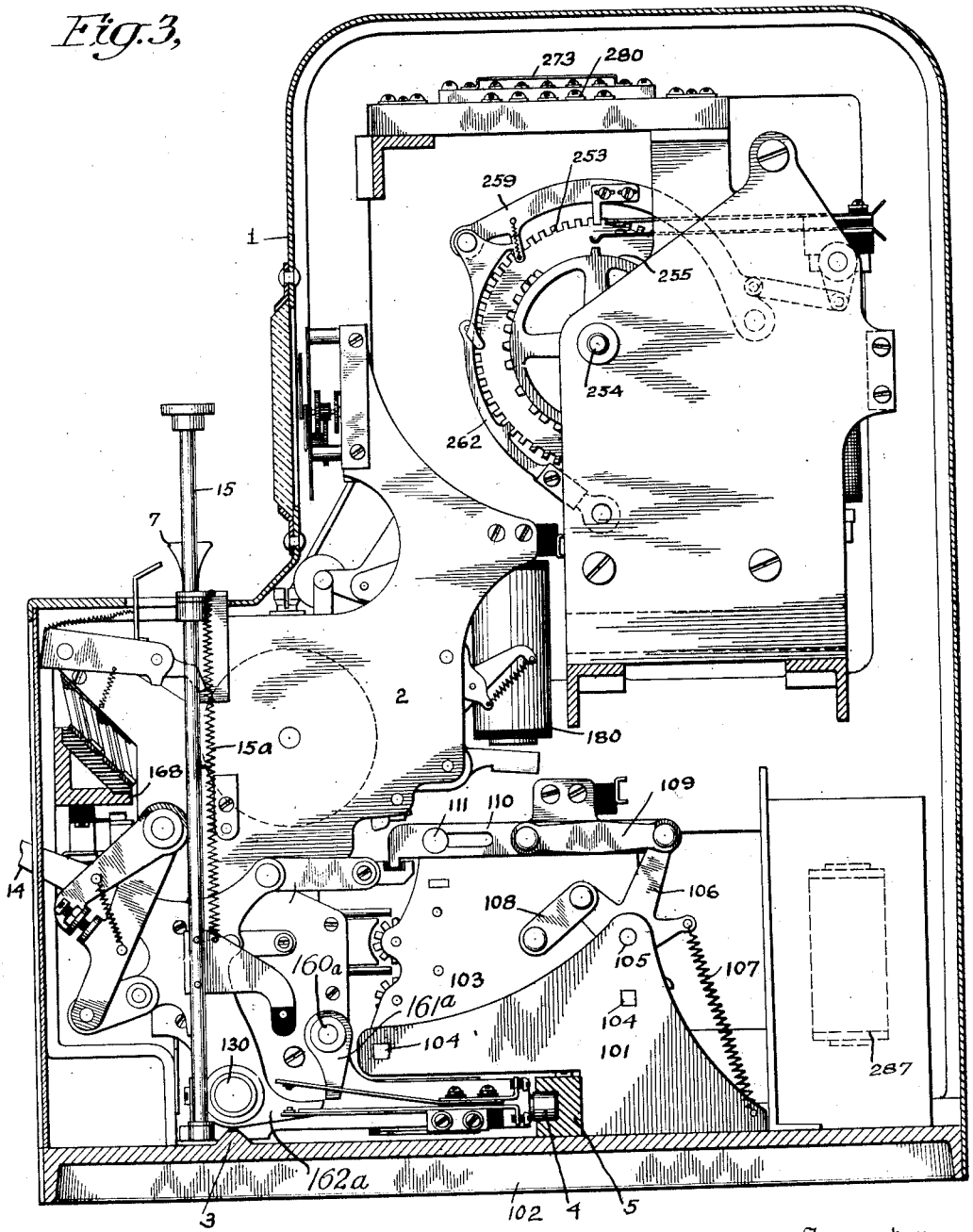
Fig. 3 is a sectional side elevation.
Figure 9:
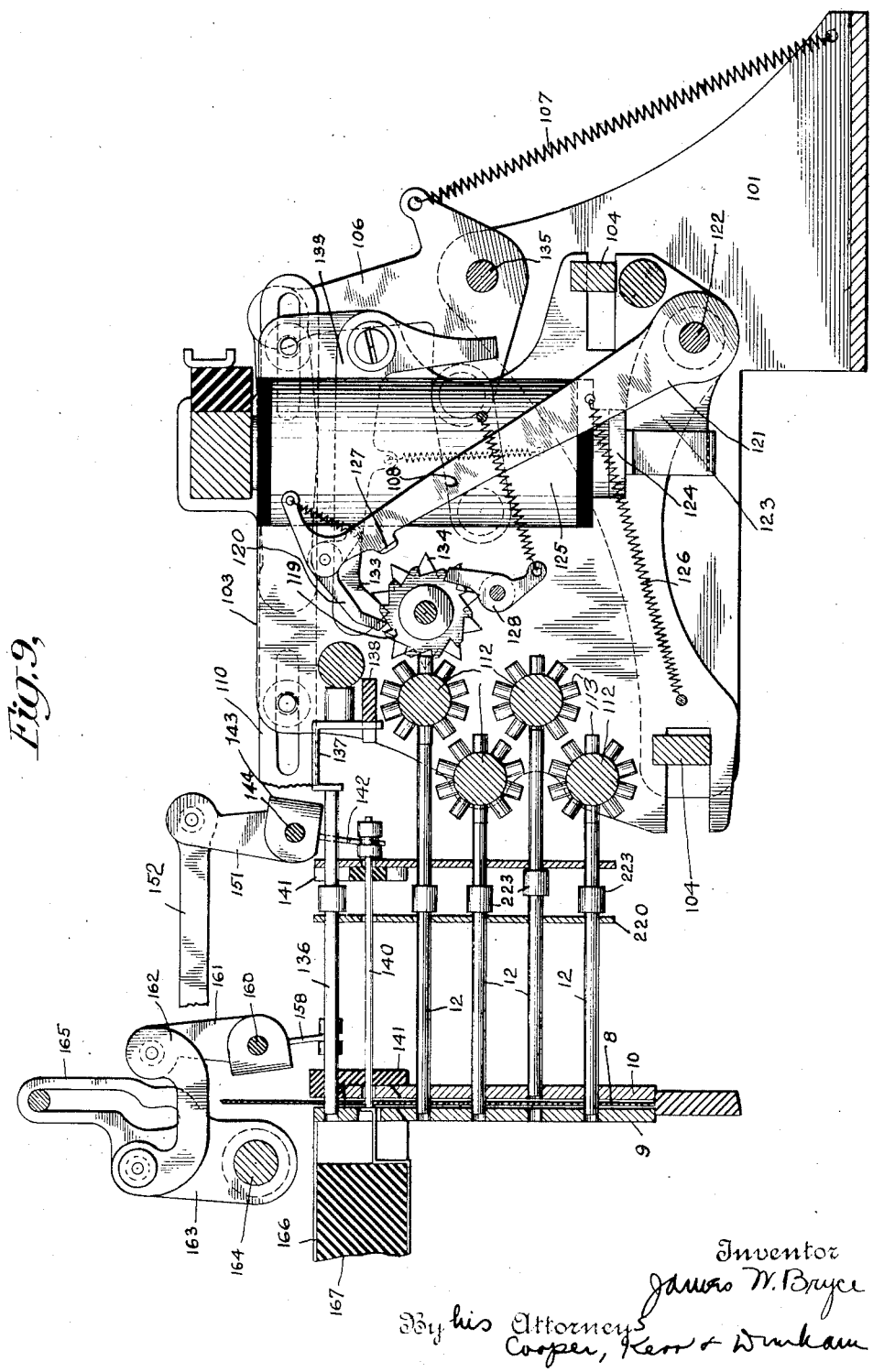
Fig. 9 is a sectional detail showing the card-punching devices, the view being taken on line 9—9 of Fig. 10.
Figure 10:
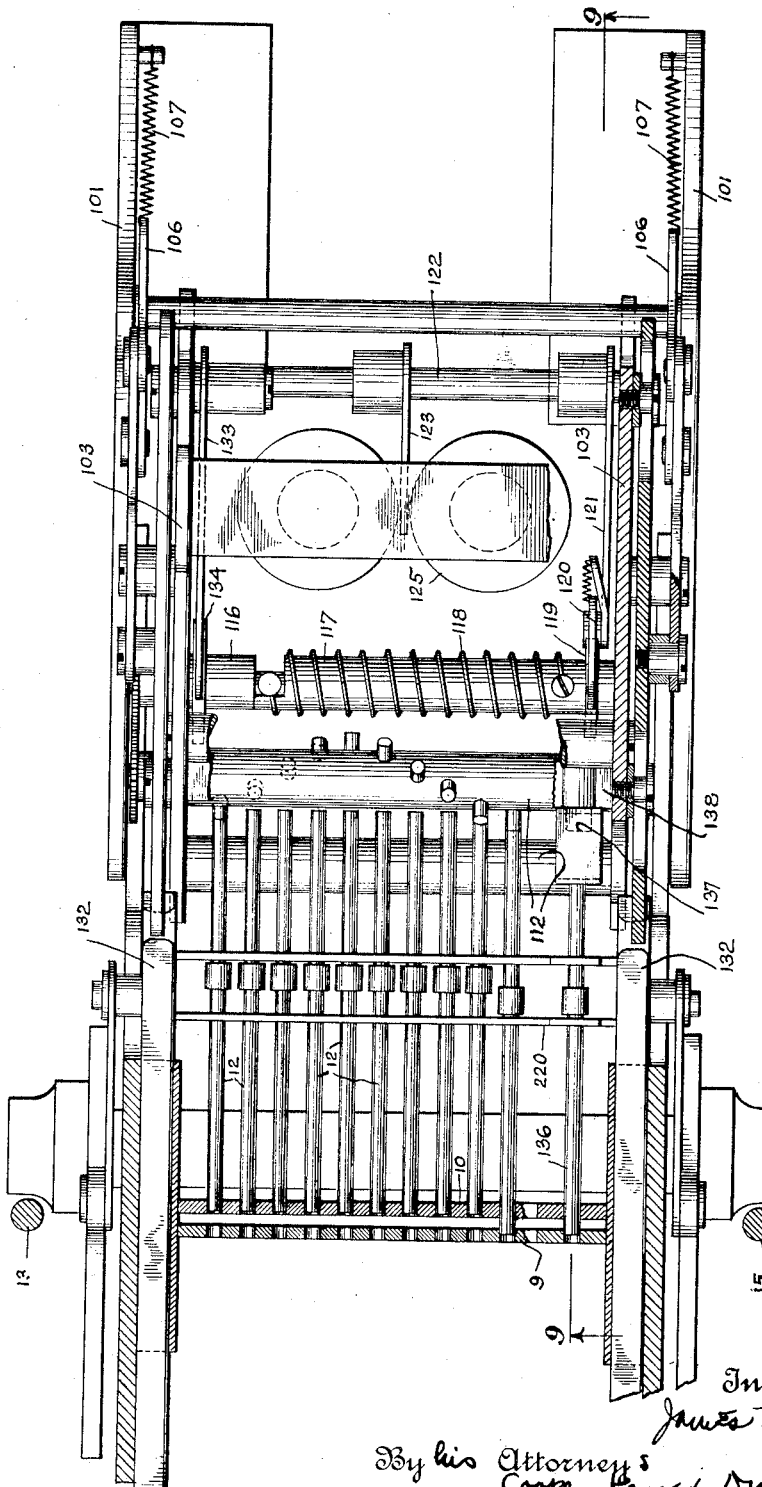
Fig. 10 is a sectional plan view of the punching devices.

Referring to Figs. 3, 6, 7, 9 and 10, each rate unit includes a pair of side supporting plates 101 fixed to the base 102 of the machine. Between these plates are two additional plates 103, slidably mounted on bars 104 fixed between the plates 101; being thus adapted for movement to the left as viewed in Fig. 6. Fulcrumed at 105 to each fixed plate 101 is a lever 106 held resiliently in the position of Fig. 3 by a spring 107. One arm of said lever constitutes part of a toggle, the other part 108 of which is connected to one of the plates 103. Lever 106 is connected by a link 109 to an arm 110 slidably supported on pins 111 in the plates 103. Movement of the arms 110 to the left as seen in Fig. 3 will, by straightening the toggle, move the plates 103 to the left as shown in Fig. 9.

Supported by and rotatably mounted between the plates 103 are four shafts 112 each having fixed therein a series of pegs 113 arranged spirally there around. On the uppermost of shafts 112 (Fig. 7) is a gear 114 meshing with a gear 115 on a shaft comprising two parts 116, 117 (Fig. 10) interconnected by a spring 118. On the part 117 of this shaft is a ratchet 119 (see also Fig. 9) adapted to be actuated by a spring-pressed pawl 120 on a lever 121 fixed on a shaft 122 bearing in the side plates 103. Also fixed to shaft 122 by means of a lever 123 is the armature 124 of an electromagnet 125 carried by the plates 103. Momentary energization of magnet 125 throws lever 121 to the position of Fig. 9 and then releases it, permitting the spring 126 to throw it forward again to actuate the ratchet 119. A tab 127 on the lever 121 is adapted to strike the ratchet at the end of the operating stroke, to prevent overthrow, while a spring-pressed locking pawl 128 prevents retrograde movement of the ratchet. The several shafts 112 are progressively connected by Geneva gearing 129 (Fig. 7) in the well known manner for carrying.

The lever 14 of the card carriage is fixed to a shaft 130, (Figs. 3 and 5) the other end of which has another lever 14ª (Figs. 4 and 7). These two levers carry hook members 132 adapted to cooperate with the members 110 of the rate device. When the lever 14 is depressed it will thus pull the plates 103 forward with the shafts 112. One of the pegs 113 on each of shafts 112 being in horizontal or operative position will engage its punch 12 (Figs. 9 and 10) and force the latter through the card.

When the parts are in punching position a spring-pressed detent lever 133 carried by plate 103 is adapted to engage a star wheel 134 fixed on the shaft portion 116 (Figs. 6, 9 and 10) to prevent the pegged shafts 112 from turning while punching is taking place. If magnet 125 is energized while punching, the resultant energy will be stored in the spring 118 until the parts are released and then transmitted to the shafts 112. When the parts are released and move back to normal position, the lever 133 will engage the shaft 135 and be lifted out of contact with the star wheel. Also a plate 220 (Figs. 5 and 6) is secured at its sides to slides 221 which are in turn connected by links 222 to levers 14 and 14ª (see also Fig. 7). When lever 14 is depressed this plate is moved forward, and when the lever is released and restored, the plate moves back against collars 223 on the punches 12 and restores the punches.

Figures 18, 19:
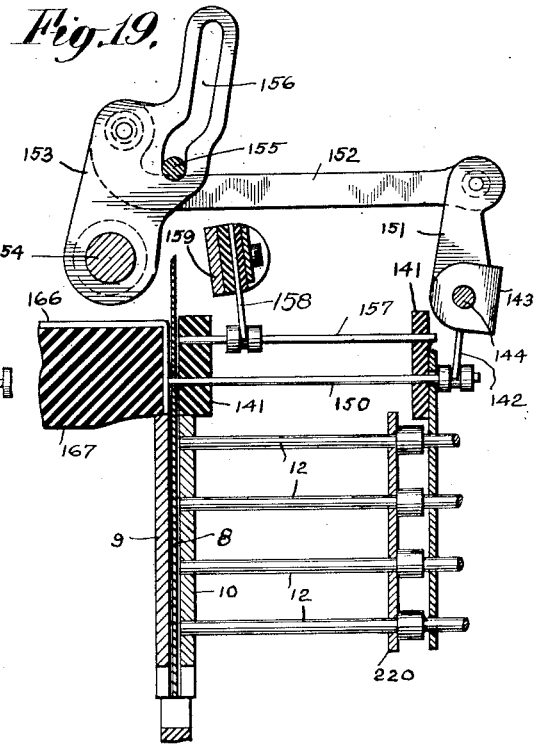
Figs. 18, 19 and 20 are details of the punch controlling mechanism.
Figure 20:
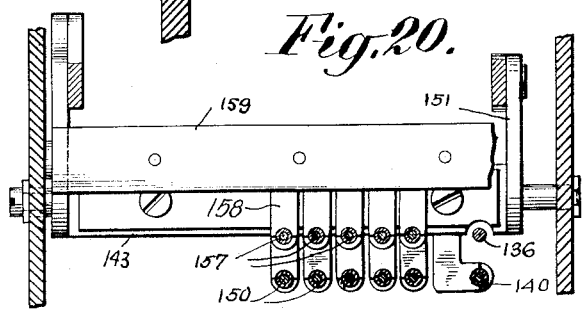

Means are provided for preventing the machine from operating unless the card is inserted correctly at the proper rate station. To this end, there are five sensing pins 157 (Figs. 6, 18, 19, 20, 22, and 23) in the same horizontal plane with the punch 136 as shown in Fig. 20 and hidden by punch 136 in Fig. 9. These pins, one for each rate station, correspond with the five hole spaces in column 15 of the card representing the five wage rates. The pins are mounted in the insulating blocks 141 and are adapted to be actuated by a metallic plate 158 carried by and insulated from a bar 159 adapted to be rocked about an axis 160 (Fig. 18) by a lever 161 connected by a link 162 to a cam lever 163 pivoted at 164. When the start key 13 is depressed the pin 22 thereon, which reaches through the cam groove 165, rocks levers 163 and 161 and presses the pins 157 against the card. The pin that finds a hole in the card will engage a corresponding electric contact plate 166 on an insulating block 167 on the card carriage. The plate 158 is slit between the several pins as shown in Fig. 20, so as to press the pins resiliently against the contacts 166, and to yield where the pins do not pass through the card. Fixed to but insulated from a bar 168 across the front of the machine (Figs. 2, 6 and 22) are five double contacts 169. These contacts are so positioned that when the carriage is moved to the several rates stations, the upper portion of the contact 169 at the particular station will engage a long contact 170 on the carriage while the lower portion of contact 169 will engage a different one of the contacts 166. Current is supplied to the parts by brushes 171 on the card carriage sliding along bars 172 carried by the bar 168 but insulated therefrom. The start key has a bracket 173 (Fig. 7 and 23) adapted to close contacts 174 when depressed.

When the card is punched at the beginning of a job, a special punch 136 (Figs. 9 and 10) will be actuated by a projection 137 on a bar 138 fixed to the side plates 103. This will punch the hole 139 in the card (Fig. 21). When the card is inserted at the end of the job, in its lower position, this hole will be presented to a sensing pin 140 (Figs. 9, 20 and 23). This pin is insulated from the machine by insulating supporting blocks 141, and is adapted to be actuated by a current-carrying plate 142 carried by but insulated from a bar 143 adapted to be rocked about an axis 144 by a lever 151 connected by a link 152 to a slotted or cam lever 153 pivoted at 154. When the stop key 15 is depressed a pin 155 reaching into the cam slot 156, rocks the levers 153 and 151 and presses the pin 140 through the hole 139 in the card. The stop key also has a bracket 175 (Fig. 5) adapted to close contacts 176.

The manner in which the foregoing elements prevent operation upon the card under improper conditions is illustrated in the wiring diagram in Fig. 23.

The card being inserted and the card carriage being adjusted to the station corresponding with the rate perforation in column fifteen of the card, in the present instance the operative rate being "C" and the double contact 169 engaging the middle of the five contacts 166, the operator depresses start key 13. This closes contact 174 and actuates plate 158 to press pins 157 against the card. The rate perforation will permit the middle of the five contacts 166 to be engaged by the corresponding pin 157. A circuit will now be set up as follows: From the source, through bar 172, brush 171, wire 177, contacts 174, plate 158, pin 157, contacts 166, 169, bar 170, wire 178, electromagnet 158$^a$ and back through the other brush 171 and bar 172 to the other side of the line. The energization of magnet 158$^a$ releases the operating lever 14. Referring to Fig. 6, the magnet 158$^a$ attracts the armature 159$^a$, fixed on the shaft 160$^a$ and thus rocks the said shaft. Referring to Fig. 5 it will be seen that the shaft 160$^a$ has fixed thereon an arm 161$^a$, the lower end of which rests directly above the end of an arm 162$^a$ which is integral with the operating lever 14 pivoted at 130. The rocking of shaft 160$^a$ moves the arm 161$^a$ to the position shown in Fig. 3, thus leaving the arm 162$^a$ free to move upwardly so that the opearting lever 14 may now be actuated. Referring to Figs. 7 and 8, it will be seen that the lever 14$^a$ is also provided with a projection 162$^a$, cooperating with another arm 161$^a$ also fixed on the shaft 160$^a$, so that the locking and unlocking of lever 14 is effected at both ends of the shaft 130.

During this punching operation the hole 139 is made as has been pointed out.

Now, when the card is inserted at the completion of the job, the carriage being adjusted to the same station, and the stop key depressed; the hole 139 will be presented to pin 140, which, with pins 150 will be pressed forward, and contacts 176 will be closed. The pin 140 will engage its special contact 166, while the middle of pins 150 will engage the middle of the five other contacts 166 through the rate "C" perforation which is now in the plane of these pins. A circuit will thus be set up as follows: from the line through bar 172, brush, 171, wire 177, contacts 176, wire 179 and its special contact 166, pin 140, plate 142, the middle pin 150, the middle of the five contacts 166, contact 169, bar 170, wire 178, magnet 158$^a$ and back through the other brush 171 and bar 172 to the other side of the line. Again the energization of this magnet will permit operation of the lever 14.

It will readily be seen that if the card carriage is at the wrong station when the operator attempts to punch, the contact 169 will cooperate with a different one of contacts 166 from that engaged by the pin 157, and the circuit through magnet 158$^a$ cannot be closed. Also, if the stop key 15 is depressed at the start, there being no hole 139 in the card as yet, the pin 140 cannot close the circuit.

Fig. 23 also shows an electromagnet 180 supplied with current through certain of the brushes 171 and bars 172. This magnet is adapted to be supplied under control of a master clock, with current at the rate of, for instance, one impulse per minute. This magnet is also mounted on the card carriage (Figs. 5 and 6) and is adapted to actuate a bell crank 181 which in turn actuates another bell crank 182 constituting in part, a locking pawl 183 and carrying a spring-pressed actuating pawl 184 and connected by a spring 185 to another locking pawl 186, all of which cooperate with a ratchet wheel 187 fixed on a shaft 188 to rotate the shaft. Fixed on said shaft is a type wheel 189 (Fig. 4) for printing minutes. Loose on the shaft adjacent the wheel 189 is another type wheel 190 (Figs. 4 and 6) for printing hours. Fixed to the hour wheel is a ratchet 191. A lever 192 (Fig.

6) adapted to be raised and dropped once each revolution of the minute type wheel by a cam 193 thereon is adapted to actuate the ratchet 191 to turn the hour type wheel.

An endless inking ribbon 193$^a$ passing around a drum 194 and guide rods 195, 196 is interposed between the card 8 and the type wheels. A rotating ink supply drum 197 is in contact with the ribbon. On the opposite side of the card is an impression pad 198 carried by levers 199 fixed on a shaft 200. On the opposite ends of this shaft are fixed levers 201 (Figs. 4 and 5) resiliently connected by springs 202 to levers 203 loose on shaft 200 and connected by links 204 to the levers 14 and 14$^a$. When the lever 14 is actuated to punch the card, the impression pad 198 will be pressed against the card, pressing the latter against the ribbon and type wheels to receive an impression of the time. Adjusting screws 205 may be provided for regulating the pressure exerted by the pad 198 upon the card.

When lever 14 is depressed, the membr 110 (Fig. 5) will engage a lever 206 and rock it clockwise upon its axis. This will cause a pawl 207 having pin and slot and spring connection with a link 208 attached to lever 206 to engage a star wheel 209 fixed on shaft 188. Thus, if the magnet 180 receives an impulse while the lever 14 is depressed and the type wheels are printing the time on the card, the type wheels will not be permitted to turn. The actuating pawls will merely take their priming stroke and be held there until the star wheel 209 is released and then impart the operating stroke to the type wheels.

The lever 207 is connected to a lever 210 loose on the shaft 211 with the ribbon drum 194. The latter lever carries a spring-pressed actuating pawl 212 co-operating with a ratchet wheel 213 fixed on shaft 211. Each downward stroke of the lever 207 thus imparts a feed stroke to the ribbon 193$^a$. A check pawl 214 prevents retrograde movement of the ratchet 213.

Fixed on the shaft 188 (Figs. 4, 6 and 7) is a gear 215 meshing with a gear 216 on a shaft 217 having universal connection through shaft 218 with a clock 219 for operating the same. The time displayed by the clock is thus the same as that kept by the type wheels.

The machine is controlled by a master clock 225 (Fig. 24) and a master contactor 226. The escapement wheel 227 of the clock has fixed on its shaft a contact arm 228 which is adapted to turn one revolution per minute. Adjacent the contact 228 is another contact arm 229 fixed on the shaft of the escapement pawl 230 and adapted to be swung thereby toward and away from the arm 228. Thus, once each minute the contact 229 wipes over contact 228. This closes a circuit through an electromagnet 231 in the master contact as follows: from the source 232, through wire 233, contacts 228, 229, magnet 231, wire 234 (see also Fig. 24$^a$) and back to the other side of the source. The energization of magnet 231 attracts the armature 235 on the pendulum 236 of the contactor and serves to control the contactor by keeping it in time.

The details of the contactor form no part of this application and will therefore not be dealt with at length here. It will be sufficient for the purpose of the present application to state that the device is provided with three pairs of electric contacts 237, 238 and 239 adapted respectively to be momentarily closed by cams 240, 241 and 242. The cam 240 is adapted to close contacts 237 at intervals of six seconds or one tenth of a minute; while the cam 241 will close contacts 238 once a minute, and cam 242 will close contacts 239 at ten minute intervals. The contacts 237 are adapted to close a circuit through electromagnet 243 as follows: from the source 232, contact 237, wire 244, magnet 243, and wire 245 back to the other side of the source. Contacts 238 will close a circuit through magnet 246 as follows: from the source through wire 233, contacts 238, wire 247, magnet 246 and wire 245 back to the source. And contacts 239 will close a circuit through magnet 248 as follows: through wire 233, contacts 239, wire 249, magnet 248 and wire 245 to the other side of the line. These three magnets will thus be energized at intervals of ten minutes in the case of magnet 248; one minute in the case of magnet 246 and one tenth of a minute in the case of magnet 243.

These magnets control multiple contact sets 250, 251 and 252. Each set comprises a sixty-tooth ratchet wheel 253 (Figs. 3, 11, 12, 13) fixed on a shaft 254 on which are also fixed nine toothed wheels 255. An electromagnet 256 is adapted through its armature 257 to rock a shaft 258 on which is fixed an arm 259 carrying a spring-pressed pawl 260 having an inclined lateral projection 261 adapted to engage the ratchet wheel 253 to actuate it. An arm 262 has a projection 263 for locking the ratchet against rotation, and a pin 264. When the magnet 256 attracts its armature it will raise arm 259. During this upward movement the projection 261 on pawl 260 will ride over pin 264 and then drop into engagement with the ratchet wheel as in Fig. 13. When the magnet releases its armature the spring 265 will restore arm 259 to its lower position. In its downward movement, the projection 261 on the pawl will press outwardly on pin 264, rocking arm 262 and releasing the ratchet wheel and turning the same one notch. The pin 261 will then slip over the upper edge of the pawl and re-engage the ratchet. A stop 266 may be carried on the arm 259 to stop the ratchet wheel in proper position before arm 262 locks it there.

Corresponding with each of the toothed wheels 255 is a pair of contacts 267 fixed on, but insulated from a shaft 268 which is connected through a lever 269 and a link 270 to the arm 259, so that when said arm is raised the contacts will be rocked down upon the wheels 255. The toothed wheels, as shown in Fig. 15 are provided with raised teeth 271, ranging in number, from nine on the first wheel down to one on the last wheel. The relative positions of the teeth on the several wheels to each other and to the ratchet wheel 263 are illustrated in Fig. 14. The radial lines 272 show the points on the wheels engaged by the contacts 267 each time they are depressed. When the contacts engage the teeth on the wheels they are closed as in Fig. 13; otherwise, as will be understood, they remain open. Thus, for one revolution of the ratchet 255 and the nine toothed wheels, the first set of contacts 267 will be closed nine times, the next eight times, etc.; the last set being closed once.

Referring again to Fig. 24 it will be seen that the magnet 256 of each of the units 250, 251, 252 is connected on one side, through wires 278, 279 to one side of the electrical supply source 232, and on the other side through wire 275, switch 276 and wires 277, 233 to the other side of the source. The magnets 243, 246 and 248 are adapted to close the switches 276. Thus it will be seen that since the magnet 248 receives an impulse once every ten minutes, the wheels of the contact unit 252 will turn one revolution in ten hours, and the first set of contacts of that unit will be closed nine times in ten hours and the last set one time in ten hours. The magnet 246, on the other hand, which receives an impulse once a minute, will rotate its wheels one revolution an hour, and the first set of contacts of that unit will be closed nine times an hour, while the last set is closed once an hour, etc. The magnet 243 which receives an impulse once every tenth of a minute or every six seconds, will rotate its wheels ten revolutions an hour, and the first set of contacts of the unit will be closed ninety times an hour, while the last set will be closed ten times.

Taking Fig. 24ᵃ in conjunction with Fig. 24, there are three sets of bus bars 273 designated X, Y, and Z. There are nine bars to each set, representing the digits 1 to 9. Each bar of the X unit is connected by a wire 274 to one of the sets of contacts 267 of the contact unit 252. The other side of each of the sets of contacts is connected through the common wire 275 and switch 276, to one side of the source of electrical energy 232. Energization of magnets 243, 246, 248 besides rotating the toothed wheels and bringing the contacts 267 down upon the wheels, will also connect the contacts to one side of the source 232. Those of said contacts as are closed by contact with the wheels, will then connect their respective bars 273 with one side of the source. These bars will then be energized whenever their respective contacts 267 are closed.

Passing under and across each set of bus bars 273 is a set of five bus bars 280. The latter bars are connected to switches 281, 282, and 283. When these switches are closed, the lowest of the bars 280 in each of the three sets of bus bars will be connected through wire 284 to the magnet 125 of the A rate device; the next of these bars in each set will be connected to the magnet of the B rate device; and the third, fourth and fifth to the C, D, and E rate devices respectively. The other side of each of the rate magnets is connected through wires 285, 286 to the source of current 232.

The three multiple switches 281, 282 and 283 are adapted to be closed by magnets 287, 288 and 289. These magnets are connected to one side of the supply of current through wires 290 and 286. The magnet 287 is connected to the other side of the supply through wire 291, the lower switch 276, and wires 277 and 233. Magnets 288 and 289 are similarly connected through 276 associated with magnet switches 246 and 243. Thus, whenever one of the switches 243, 246 or 248 is closed to cause actuation of wheels 255 and contacts 267 and 276, the corresponding set of switch contacts 281, 282 or 283 will be closed.

Figure 2:
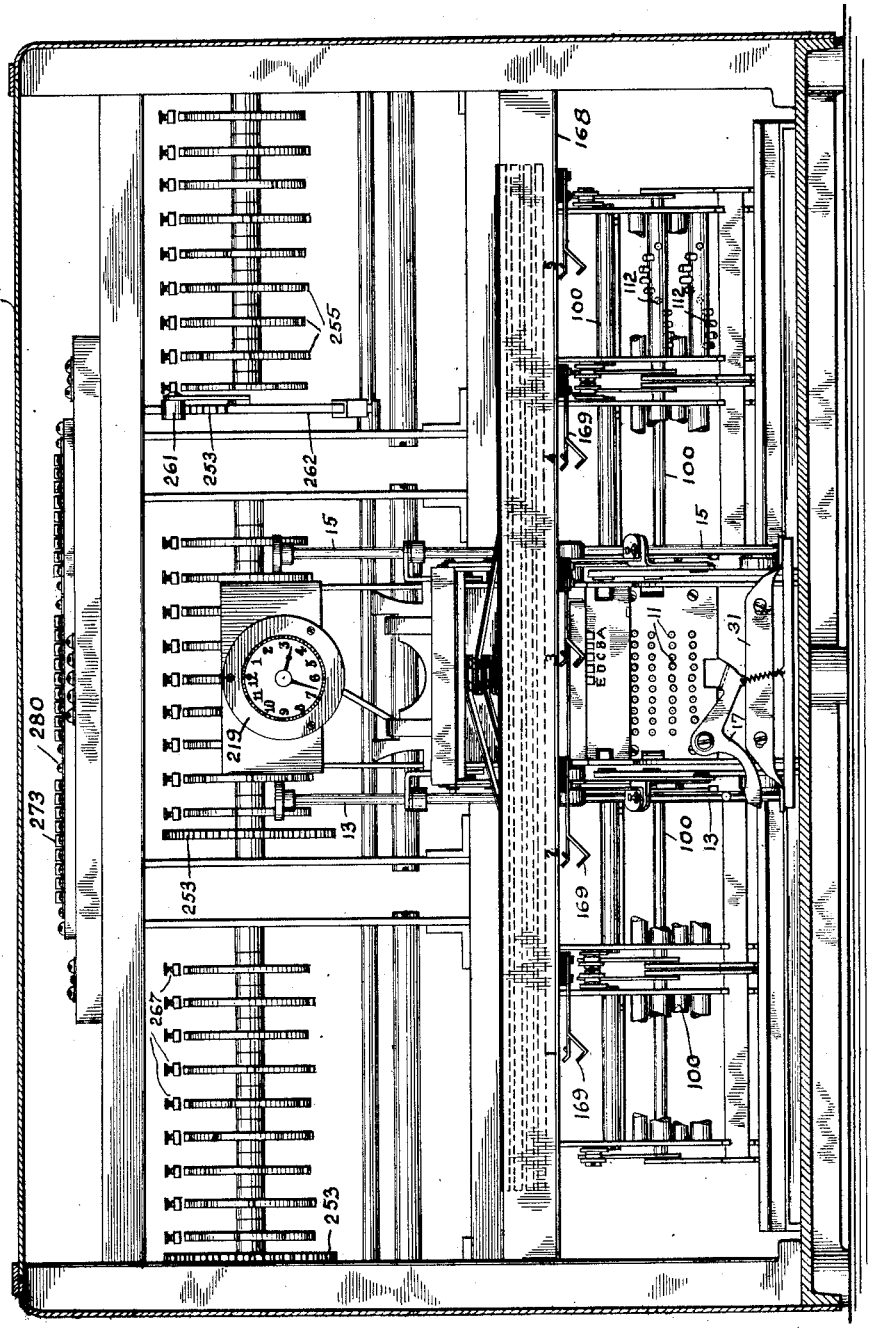
Fig. 2 is a similar view with the front wall removed.
Figure 16:
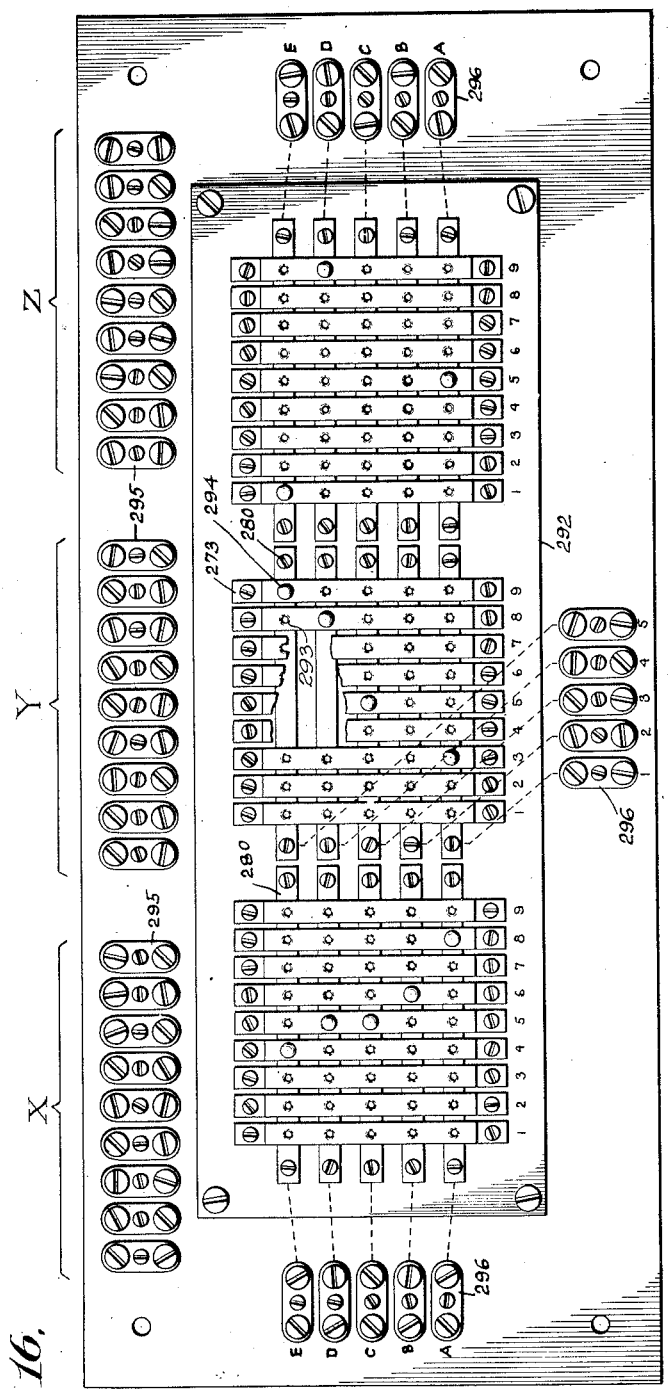
Fig. 16 is a plan view of a cross connection panel for setting up the rates at which the machine is to operate.
Figure 17:
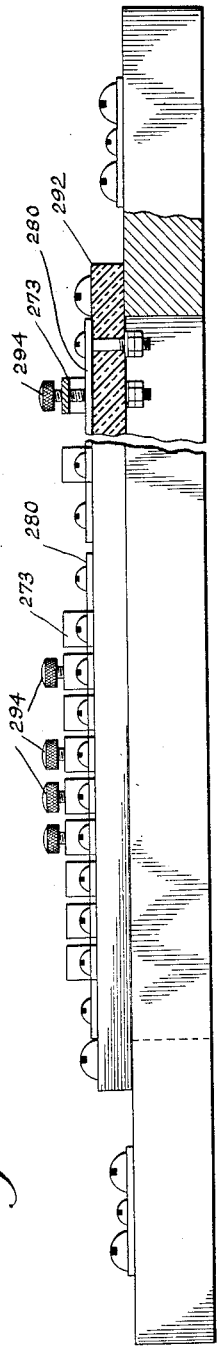
Fig. 17 is a front elevation partly in section and on a larger scale of said panel.

The position of the bus bars 273 and 280 in the machine is shown in Figs. 2 and 3, and their detailed construction is shown in Figs. 16 and 17. The bars 280 are shown as lying flat upon an insulating plate 292 and secured thereto, while the bars 273 pass above and out of contact with bars 280, being also secured at their ends to the plate 292. Each of the bars 273 has a threaded hole 293 above each of the bars 280, so that any of the bars 273 may be connected to any of the bars 280 of the same set by the insertion of a screw 294. Terminal posts 295 may be provided for the bars 273, and similar posts 296 for the bars 280.

Returning now to the wiring diagram, and assuming that we are to set up the C rate device to operate at the rate of 55 cents an hour, if each impulse transmitted to the magnet 125 represents a value of one cent, it will be necessary to transmit impulses to the C magnet at the rate of fifty five an hour. To do this a screw 294 is inserted in the fifth of the bars 273 to connect it electrically with the C bar 280 of the X set of bars. In the Y set of bars, the fifth bar 273 is also connected to the C bar. As there is no fraction of a cent to be computed, the bars of the Z set will not be connected to the C magnet. Now, the contacts 237 of the master contactor close every one tenth of a minute, causing the wheels 255 of the set 250 to turn ten revolutions an hour. The fifth of wheels 255 which is connected to the now active one of bars 273 in the X set has five teeth thereon so that the contacts 267 associated therewith will be closed five times per revolution or fifty times an hour. The C magnet thus receives from the X set of contacts and bars, fifty impulses. The wheels of the set 251 turn one revolution an hour, so that the fifth wheel which has five teeth causes its contacts to close five times an hour. This transmits five more impulses to the C magnet, making a total of fifty five for one hour.

To take another instance, assume that the E rate device is to perform at the rate of 37½ cents an hour. The "3" digit bar 273 of the X set will be plugged for connection with the E bar of that set; the "7" digit bar of the units set will be plugged for connection with the E bar of the set; and the "5" digit bar of the Z set will be plugged for connection with the E bar of that set. The E magnet will now receive thirty impulses an hour through the X contacts and bars; seven through the Y contacts and bars, and one every two hours or at the rate of one half per hour through the Z contacts and bus bars, making a total of 37½ impulses an hour.

It should be understood that the impulses received by any one of the rate device magnets through the sets 250, 251, and 252 of contacts do not occur simultaneously, but are received in succession. This may be accomplished in several ways, as for instance, by so timing the cams 240, 241 and 242 of the master contactor that they will close their contacts in staggered order.

It will now be recognized that any of the several rate devices may be given actuating impulses at the rate of from ten to ninety impulses per hour through the set 250 of contacts and its corresponding set of bus bars 273, 280. The devices may be given additional impulses at the rate of from one to nine per hour through the set 251, and at the rate of from one tenth to nine tenths of an impulse per hour through the set 252. In other words, giving each impulse a value of one cent, a rate device may be set to accumulate at any rate ranging in tenths of a cent from one tenth to ninety nine and nine tenths cents per hour. Obviously, the range of the machine may be raised by adding another set of contacts similar to the sets 250, 251, 252 with the related elements, or by re-arrangement of the parts. Also, the increments may be changed from one tenth of a cent as here illustrated, to other fractions as, for instance, by changing the number of teeth on the toothed wheels 255.

While I have shown a card carriage adapted to be controlled in perforating a card by the spined shafts of the rate device or counter, it is obvious that in a simplified form, the perforating of a card may be dispensed with, and the readings taken visually from the counter. This in turn would, of course, permit a simpler form of counter having the digit values indicated thereon.

*Summary of operation*

When an operator is to commence a particular job, he is given a card similar to that shown in Fig. 21. The clerk knowing the rate of pay received by the particular workman, punches the card at one of the several positions designated at A to E, respectively. The operator then inserts the card in the pocket 7 as shown in Fig. 6, with the end appearing at the left in Fig. 21, downward, and the face of the card toward the back of the machine. The operator moves the carriage shown in Fig. 4 along its trackway to the rate station corresponding to the rate perforations in his card, and depresses the start key 13, and thus rocks the lever 17 so as to hold the card in its upper position so that the first column of hole spaces will register with the lowermost row of punches 12. This also places the 15th column of hole spaces in register with the feeler pins 157 and the punch 136, shown in Figs. 9, 18, 20, etc. The depression of the start key also actuates the pins 157, pressing them against the card so that the one thereof that cooperates with the rate perforation will engage the electric contact 166. This energizes the magnet 158$^a$ if the card carriage is in the proper rate position and moves the latches 161$^a$ to inoperative position as shown in Fig. 3, to permit the actuation of the lever 14. The operator then depresses this lever causing the four peg shafts 112 to be moved forward or in other words to the left as viewed in Fig. 6, to the position of Fig. 9, so that the pegs 113 will engage the punches 12 and force such punches through the card. In this way one hole will be punched in each of columns 1, 4, 7 and 10 and a hole designated 139 (Fig. 21) will be punched in the upper part of column 15 of the card. The operator then removes the card and proceeds to perform his work. While he is thus engaged upon his job, the machine is being operated by clock mechanisms so that the peg shafts 112 will be rotating and thus changing the positions of the pegs 113. When the operator completes the job he places the card once more in to the machine, seeing that the card carriage is adjusted to the same rate station and then depresses the stop key 15. The card now assumes its lower position in the machine, being adjusted to such position by fingers 18' which are actuated by the stop key to a position above the card to positively push the card down to the bottom of the slot. The stop key also presses the feeler pins 150, (see Figs. 19 and 20), against the card. Column 15 of the card is now in register with these pins so that one of the pins will now pass through the rate perforation previously operated upon by pins 157.

If the card carriage is in the proper position, the electromagnet 158ᵃ will again be energized to release the operating lever 14 as before. A special feeler pin 140 now registers with the hole 139 in the card, and closes a circuit as indicated in Fig. 23, through wire 179, contacts 176 which are closed by the stop key and through contact pins 150 and through contact 169, if the card carriage is at the proper rate station, thus energizing magnet 158ᵃ once more and again releasing the lever 14 for operation.

The operator then depresses this lever, again moving the peg shafts 112 into cooperation with the punches 12. One hole will now be punched in each of columns 3, 6, 9, and 12. The operator now removes the card and the difference between the number represented by the first set of perforations and that represented by the second set of perforations, constitutes the cost of the job. This figure may be ascertained by observing the position of the hole in each column. The digits perforated in coulmns 1, 4, 7, and 10, in the present instance, are 1452. While the digits represented by perforations in columns 3, 6, 9, and 12 are 1634. The difference between the two numbers is 182, which, in terms of cents, represents $1.82.

In actual practice, the difference between the two numbers is ascertained by using a machine adapted to automatically read the two numbers and determine the difference between them and print this difference upon the card. This machine forms no part of the present invention and is therefore not dealt with here.

Another function performed by the start key when the card is inserted in the machine for the first time, is to rock the lever 199 having an impression pad, 198 shown in Fig. 6, against the card and pressing the latter against an inked-ribbon and type wheels 189, etc., and in this way print the starting time in the column designated "Start." The stop key in a similar manner again presses the lever 199 against the card and type wheels and prints the time that the job was completed in the column designated, "Stop."

Having described my invention, what I claim is:

1. In a cost-computing machine, an accumulating device, a plurality of sets of electric contacts, one of said sets being adapted to be closed from one to nine times respectively during an interval of time, another of said sets being adapted to be closed from one to nine times respectively during an interval of time having a value ten times that of said first-named interval, a third of such sets being adapted to be closed from one to nine times respectively during an interval of time having a value one-tenth that of said first-named interval, said contacts being adapted to be variously connected to said accumulating device for causing actuation thereof.

2. In a cost-computing machine having an accumulating device and means for producing a record therefrom, a plurality of sets of electric contacts, means for closing one of said sets of contacts from one to nine times respectively during an interval of time, means for closing another one of said sets of contacts from one to nine times respectively during an interval of time having a value ten times that of said first-named interval of time, means for closing a third of said sets of contacts from one to nine times respectively during an interval of time having a value one-tenth that of said first-named interval of time, said contacts being adapted to be variously connected to said counter for actuation thereof.

3. In a computing machine, a plurality of sets of time-operated elements, an accumulating device adapted to be differentially connected to one or more of said sets to be operatively controlled thereby, one of said sets being adapted to impart operating impulses to said accumulating device at the rate of from one to nine during an arbitrary interval of time, another of said sets being adapted to impart operating impulses to the accumulating device at the rate of from one to nine during an arbitrary interval of time ten times the value of said first-mentioned interval of time, and a third of such sets being adapted to impart to the accumulating device operating impulses at the rate of from one to nine during an interval of time one-tenth the value of said first-named interval of time.

4. In a computing machine, a plurality of sets of time-operated elements, an accumulating device adapted to be differentially connected to one or more of said sets to be operatively-controlled thereby, one of said sets being adapted to impart to the accumulating device a predetermined variable number of operating impulses during an interval of time, another set being adapted to impart similar impulses during a greater interval of time, and a third of said sets being adapted to impart similar impulses during a shorter interval of time.

5. In a computing machine having an accumulating device and record making means adapted to be controlled thereby, a plurality of sets of time-operated elements, means for connecting said accumulating device to one or more of said sets to operatively control the accumulating device, one of said sets being adapted to be operated a variable number of times during an arbitrary period of time, another set being adapted to be similarly operated during a fractional part of said arbitrary time, and a third of said sets being adapted to be similarly operated during a period of time a multiple of said arbitrary period of time.

6. In a computing machine, a plurality of sets of time-operated elements, one of said sets being adapted to be operated at variable intervals during an arbitrary period of time, another set being adapted to be similarly operated during a fraction of said period of time, a third of such sets being adapted to be similarly operated during a multiple of said first-named period of time, and a plurality of accumulating devices each adapted to be variously connected to one or more of said sets to be controlled thereby.

7. In a computing machine, a plurality of groups of circuit-closing members, there being nine members to each group, each member of one group being adapted to close at different intervals during a period of time, each member of another group being adapted to close at separate intervals of time during a fraction of said period of time, each member of a third of such groups being adapted to close at separate intervals during a multiple of said first-named period of time, and a plurality of accumulating devices, any one or more of said accumulating devices being adapted to be connected to any member of one or more of said groups to be controlled thereby.

8. In a computing machine, a plurality of groups of circuit closing members, time-controlled means adapted to close each of said members at a different stated interval, and an electromagnetically actuated accumulating device adapted to be selectively connected to one or more of said members to be controlled thereby.

9. In a cost recording machine, a plurality of accumulating devices, time-controlled means adapted to be connected to said accumulators for causing the latter to accumulate at predetermined rates, means within the machine for varying the rate of operation of the counter, card-perforating means adapted to be controlled by any of said accumulators, and means controlled by the card being perforated for controlling the operativeness of said perforating means.

10. In a cost recording machine, a plurality of accumulators, means for causing said accumulators to operate at predetermined rates, card-perforating means adapted to be controlled by any one of said accumulators, means for positioning a card at a different station for each accumulator for perforating, means controlled by a card being perforated for controlling said positioning means.

11. In a cost recording machine, a plurality of accumulators, means for causing said accumulators to operate at predetermined rates, card-perforating means adapted to be controlled by any one of said accumulators, and means controlled by a card being perforated for determining which of said accumulators shall control the perforating means, and for preventing operation of the perforating means when an operator attempts to use another of the accumulators.

12. In a cost-computing machine, an accumulating device, a plurality of sets of electric contacts, one of said sets being adapted to be closed a variably predetermined number of times during an interval of time, another set being adapted to be closed a similar number of times during an interval of time greater than said first-named interval, a third of such sets being adapted to be closed a similar number of times during an interval of time less than said first-named interval, said contacts being adapted to be connected to said accumulating device for causing actuation thereof.

13. In a cost-computing machine, an accumulating device, a plurality of sets of electric contacts, one of said sets being adapted to be closed a variably predetermined number of times during an interval of time, another set being adapted to be closed a similar number of times during an interval of time greater than said first-named interval, a third of such sets being adapted to be closed a similar number of times during an interval of time less than said first-named interval, said contacts being adapted to be variously connected to said accumulating device for causing actuation thereof.

14. In a cost-producing device, a plurality of groups of impulse-producing elements, the elements of the separate groups being adapted to produce impulses of different variable values, and recording means adapted to be variably connected to one or more of said groups to be controlled thereby.

15. A calculating machine comprising electrically controlled accumulating mechanism, means for controlling the operation and entry of amounts into said accumulating mechanism in accordance with two factors of a computation whereby the accumulating mechanism will set up a product representation, said means including selective electrical circuit devices for controlling the operation of the accumulating mechanism in accordance with one of the factors, a punching mechanism for punching product representations upon a tabulating card and means for controlling the operation of said punching mechanism by the aforesaid accumulating mechanism.

16. A calculating machine comprising electric current impulse receiving means, means in the machine for selecting the impulses which are to be controlling, an accumulating mechanism, means for directing the selected impulses into the accumulating mechanism to thereby set up in said accumulating mechanism a product representation, punching mechanism, and means for controlling the said punching mechanism in accordance with the set up of the accumulating mechanism whereby a tabulating card may be perforated with punchings representative of a product.

17. A calculating machine including an electrically controlled accumulating mechanism, means for introducing into the machine a plurality of value current impulses, means for selecting out of the aforesaid introduced impulses impulses in accordance with one factor of a computation which the machine is to perform, means for controlling the accumulating mechanism in accordance with the selected impulses so that the setting of the accumulating mechanism will represent a product and a punching mechanism adapted to punch a tabulating card with means for controlling it by the aforesaid accumulating mechanism whereby product representing punching may be punched thereby.

18. In a calculating machine including a punching mechanism for punching upon tabulating cards representations of products, an electrical controlled accumulating mechanism, means for initiating electrical current impulses which are adapted to control the operation of the accumulating mechanism, means including electrical connectors for selectively establishing circuits for the impulses to the accumulating mechanism in accordance with one factor of a computation whereby the accumulating mechanism will be controlled to set up thereon a representation of a product and means for controlling the punching mechanism by the accumulating mechanism whereby the former will punch product representations of the amount set up upon the accumulating mechanism.

19. In a calculating apparatus a perforating apparatus adapted to perforate a tabulating card with perforations which are representative of products and means for controlling the setting of the perforating apparatus including a series of lines, means for imparting impulses to the lines, and means for controlling and coordinating the impulses upon and from said lines to control the setting of the perforating apparatus in accordance with the multiplication of two factors of a computation whereby the perforating device under the control of the impulses is set up in a condition to punch a product.

20. In a calculating apparatus an electrically controlled accumulating apparatus, a series of impulse transmitting lines, means for controlling the flow of impulses over the lines to the electrically controlled accumulating mechanism in accordance with two factors of a computation, said means including selective means to permit the selection of the impulses which are pertinent to a particular product which is correlated to one factor of the computation and to permit flow of the impulses which are correlated to such factor, a punching mechanism controlled by the electrical accumulating mechanism for punching a product representation set up upon the electrical accumulating mechanism and means for perforating a tabulating card by said punching mechanism with product representing perforations.

21. In a calculating apparatus including a series of lines, means for controlling the transmission of impulses thereon according to one factor of a multiplying computation, means for also controlling the transmission of impulses according to the other factor of the computation whereby impulses representative of products flow over the lines, an electrically controlled accumulating mechanism, means for controlling said mechanism by the product representing impulses which are coordinated to one of the factors of the computation said means including provisions for selecting the product impulses which are coordinated to that particular factor of the computation, a tabulating card punching mechanism and means for controlling said punching mechanism by the electrical accumulating mechanism whereby the punching mechanism may perforate a tabulating card with perforations representative of products.

In testimony whereof I hereto affix my signature.

JAMES W. BRYCE.